US011585940B2

(12) United States Patent
Ahn

(10) Patent No.: US 11,585,940 B2
(45) Date of Patent: Feb. 21, 2023

(54) METHOD OF MEASURING THE DISTANCE TO A SATELLITE IN CONSIDERATION OF QUANTUM AND GRAVITY EFFECTS, METHOD OF MEASURING A LOCATION USING THE SAME, AND USER TERMINAL

(71) Applicant: University of Seoul Industry Cooperation Foundation, Seoul (KR)

(72) Inventor: Do Yeol Ahn, Seoul (KR)

(73) Assignee: FIRST QUANTUM INC., Seoul (KR)

( * ) Notice: Subject to any disclaimer, the term of this patent is extended or adjusted under 35 U.S.C. 154(b) by 15 days.

(21) Appl. No.: 17/141,660

(22) Filed: Jan. 5, 2021

(65) Prior Publication Data

US 2022/0043165 A1    Feb. 10, 2022

(30) Foreign Application Priority Data

Jul. 31, 2020  (KR) ........................ 10-2020-0096015

(51) Int. Cl.
*G01S 19/00* (2010.01)
*G01S 19/07* (2010.01)
*G01S 19/40* (2010.01)
*G01S 19/47* (2010.01)

(52) U.S. Cl.
CPC .............. *G01S 19/07* (2013.01); *G01S 19/40* (2013.01); *G01S 19/00* (2013.01); *G01S 19/47* (2013.01)

(58) Field of Classification Search
CPC .......... G01S 19/00; G01S 19/47; G01S 19/07; G01S 19/40

USPC .................... 342/352, 357.2, 357.23, 357.44
See application file for complete search history.

(56) References Cited

U.S. PATENT DOCUMENTS

| 5,552,794 A | * | 9/1996 | Colley | .................... G01S 19/42 |
| | | | | 342/357.35 |
| 5,955,986 A | * | 9/1999 | Sullivan | .................... G01S 5/12 |
| | | | | 342/357.68 |
| 6,112,054 A | * | 8/2000 | Kita | .................... H04B 7/1855 |
| | | | | 455/12.1 |

(Continued)

*Primary Examiner* — Chuong P Nguyen
(74) *Attorney, Agent, or Firm* — Kile Park Reed & Houtteman PLLC

(57) ABSTRACT

A method of measuring a distance to a satellite, which is performed by an electronic device, according to an exemplary embodiment of the present invention, the method comprises receiving a linearly polarized photon from and angular momentum per unit mass of the satellite from the satellite; measuring an amount of rotation of the polarized photon, the rotation being induced by a space-time warpage due to gravity; and calculating a distance to the satellite by using the rotation amount of the polarized photon and the angular momentum per unit mass of the satellite. The distance to the satellite may be calculated by the following equation, $$\sin\Theta(r) \cong -\frac{l_{obs}}{\sqrt{rr_s}}\sqrt{1-\frac{r_s}{r}},$$

wherein '$2\Theta$' is the rotation amount of polarized photon, '$l_{obs}$' is the angular momentum per unit mass of the satellite, '$r$' is the distance to the satellite, and '$r_s$' is the Schwarzschild radius of the Earth.

8 Claims, 13 Drawing Sheets
(9 of 13 Drawing Sheet(s) Filed in Color)

(56) References Cited

U.S. PATENT DOCUMENTS

| | | | | |
|---|---|---|---|---|
| 6,680,696 B1* | 1/2004 | Hayashi | ............... | G01S 5/12 |
| | | | | 342/357.2 |
| 8,587,475 B2* | 11/2013 | Leandro | ............ | G01S 19/40 |
| | | | | 342/357.27 |
| 9,671,501 B2* | 6/2017 | Leandro | ............ | G01S 19/40 |
| 9,945,952 B2* | 4/2018 | Arcidiacono | ......... | G01S 5/02 |
| 2014/0085139 A1* | 3/2014 | Leandro | ............ | G01S 19/03 |
| | | | | 342/357.26 |
| 2022/0014361 A1* | 1/2022 | Ahn | ................ | H04L 9/0852 |

\* cited by examiner

METHOD OF MEASURING THE DISTANCE TO A SATELLITE IN CONSIDERATION OF QUANTUM AND GRAVITY EFFECTS, METHOD OF MEASURING A LOCATION USING THE SAME, AND USER TERMINAL

CROSS REFERENCE TO RELATED APPLICATION

This application claims priority from and the benefit of Korean Patent Applications No. 10-2020-0096015, filed on Jul. 31, 2020, which is hereby incorporated by reference for all purposes as if fully set forth herein.

BACKGROUND OF THE INVENTION

Field of the Invention

The present invention relates to a method of measuring the distance to a satellite, a method of measuring a location using the same, and a user terminal. More particularly, the present invention relates to a method of measuring the distance to a satellite in consideration of quantum and gravity effects, a method of measuring a location using the same, and a user terminal.

Discussion of the Background

In the modern society, positioning technology such as GPS is widely used in vehicle navigation and user terminals such as smartphones. Currently, in the technology used for GPS, position is measured by using the distance from a user terminal to the satellite by receiving the electromagnetic wave transmitted from the satellite by the user terminal on the ground. In more detail, measuring a position using a triangulation method, in which distances from three or more satellites and coordinates of each satellite is used, is performed.

However, there is an error in distance measurement to a SATELLITE, so the error of GPS up to now is relatively large.

The present invention provides a method of more accurately measuring a distance to a satellite through a rotation amount of polarized photons when passing through space-time warped by a gravity.

Even an experiment in the regime where a quantum system evolves on classical curved space-time has never been fully assessed. Here, we describe a photon state with 1a unitary irreducible representation of the Wigner Rotation to investigate geometric phases induced by gravitational field between the ground station and the satellites in the Earth Orbits for various states of observers. It is found that there are general relativistic, or classical, and the quantum component in the Wigner rotation; When an observer is in a spiraling orbit, the quantum component is obtained from 10-6 degree to 10-4 degree depending on the altitude of the Earth Orbits, which should be measurable. This quantum rotation produced by the gravitational field would be the result of intertwining of quantum and general relativity on the photon state and would open up the road to test the gravitational effects on the quantum systems.

Describing photon states observed by a moving observer (e.g., a satellite) in curved spacetime requires the understanding of both quantum mechanics and general relativity, two essential branches of modern physics. One of the conceptual barriers for the relativistic treatment of quantum information is the difference of the role played by the wave fields and the state vectors in relativistic quantum theory. In non-relativistic quantum mechanics, the wave function of the Schrödinger's equation gives the probability amplitude which can be used to define conserved particle densities or density matrices. However, it was discovered that the relativistic equations are only indirect representations for probability waves of a single particle. In 1939, Wigner proposed the idea that the quantum states of relativistic particles can be formulated without the use of wave equations. He showed that the states of a free particle are given by a unitary irreducible representation of the Poincare group. In Wigner's formulation, relativistic-particle states in different inertial frames are related by a little group element in the irreducible representation of Poincare group, called Wigner rotation.

While Wigner's original proposal was for the special relativity, there have been several attempts to extend it to the domain of general relativity. Since extending Wigner's group to curved spacetime requires the standard directions (xyz) at every event, by introducing tetrads (frame fields) to define local coordinates, it has been shown that moving-particle states in curved spacetime are transformed into each other by the Wigner rotation. For free-space QKD systems, it induces the rotation of linear polarization of a photon observed between an earth ground station and a satellite in the near-Earth orbit. Thus, it would be a particularly important problem from not only a fundamental point of view for testing general relativistic effects on quantum theory but also an application point of view for precision quantum metrology and free space quantum communication.

In this work, it is demonstrated that the existence of non-trivial Wigner rotation experienced by photons sent from the earth ground station to a free-falling observer with non-zero angular momentum. We model the spacetime around Earth with Schwarzschild spacetime where tetrad fields can be globally defined as orientation-preserved coordinate basis and we use the (− + + +) metric signature. Furthermore, it is also assumed34 that quantum field theories on spacetimes admit a spinor structure which will be employed for the quantum state of the photon with given polarization. Considering that not much work has been done on an experimental assessment of the regime in which quantum systems evolve on classical curved space-time, our model could provide the test bed for probing the gravitational effects on the quantum system.

SUMMARY OF THE INVENTION

An object to be solved by the present invention is to provide a method of measuring a distance to a satellite by using a rotation amount of polarized photon, which is caused by warp of space-time due to gravity.

Another problem to be solved by the present invention is to provide a method of measuring a location by using the method of measuring a distance to a satellite.

Another problem to be solved by the present invention is to provide a user terminal for implementing the method of measuring a location.

The method of measuring a distance to a satellite, which is performed by an electronic device, according to an exemplary embodiment of the present invention, the method comprises receiving a linearly polarized photon from and angular momentum per unit mass of the satellite the satellite; measuring an amount of rotation of the polarized photon, the rotation being induced by a space-time warpage due to gravity; and calculating a distance to the satellite by using the rotation amount of the polarized photon and the angular momentum per unit mass of the satellite.

The distance to the satellite may be calculated by the following equation, $$\sin\Theta(r) \cong -\frac{l_{obs}}{\sqrt{rr_s}}\sqrt{1-\frac{r_s}{r}},$$

wherein '2Θ' is the rotation amount of polarized photon, '$l_{obs}$' is the angular momentum per unit mass of the satellite, 'r' is the distance to the satellite, and '$r_s$' is the Schwarzschild radius of the Earth.

The method of measuring a location according to an exemplary embodiment of the present invention comprises receiving, by an electronic device, from at least three or more satellites, a polarized photon of each satellite and angular momentum per unit mass of the satellites; measuring, by the electronic device, an amount of rotation of the polarized photon of each satellite, the rotation being induced by warpage of space-time due to gravity; calculating, by the electronic device, a distance to each satellite by using a rotation amount of polarization of each satellite and an angular momentum per unit mass of each satellite; and calculating a position relative to each of the satellites by the electronic device by using the distance to each of the satellites.

The distance to each satellite may be calculated by the following equation, $$\sin\Theta(r) \cong -\frac{l_{obs}}{\sqrt{rr_s}}\sqrt{1-\frac{r_s}{r}},$$

wherein '2Θ' is the rotation amount of polarized photon, '$l_{obs}$' is the angular momentum per unit mass of the satellite, 'r' is the distance to the satellite, and '$r_s$' is the Schwarzschild radius of the Earth.

For example, the electronic device may further receive a coordinated of each of the satellites from each of the satellites, when receiving the polarized photon and angular momentum per unit mass of the satellites, and the electronic device further calculates a position of the electronic device, when calculating a position relative to each of the satellites.

The user terminal according to an exemplary embodiment of the present invention comprises a photon reception unit, a satellite information reception unit, a polarization rotation measurement unit, and a calculation unit. The photon reception unit receives a polarized photon of each satellite from at least three or more satellites. The satellite information reception unit receives an angular momentum per unit mass of each satellite from the at least three or more satellites. The polarization rotation measurement unit measures a rotation amount of the polarized photon received by the photon receiving unit from each satellite. The calculation unit calculates a distance to each of the satellites by using the rotation amount of the polarized photon, and the angular momentum per unit mass of each of the satellites, and calculates relative position of the user terminal by using the distance to each of the satellites.

The calculation units may calculate the distance to each of the satellites by the following equation, $$\sin\Theta(r) \cong -\frac{l_{obs}}{\sqrt{rr_s}}\sqrt{1-\frac{r_s}{r}},$$

wherein '2Θ' is the rotation amount of polarized photon, '$l_{obs}$' is the angular momentum per unit mass of the satellite, 'r' is the distance to the satellite, and '$r_s$' is the Schwarzschild radius of the Earth.

The satellite information reception unit may further receive a coordinate of each of the satellites from the each of the satellites, and the calculation unit may calculate a coordinates of the user terminal by using the coordinate of each of the satellites.

As described above, according to the present invention, it is possible to more accurately measure the distance between the satellite and the user terminal, thereby improving accuracy in a location measuring system such as GPS.

BRIEF DESCRIPTION OF THE DRAWINGS

The patent or application file contains at least one drawing executed in color. Copies of this patent or patent application publication with color drawings will be provided by the Office upon request and payment of the necessary fee.

DETAILED DESCRIPTION OF THE ILLUSTRATED EMBODIMENTS

Figure 1A:
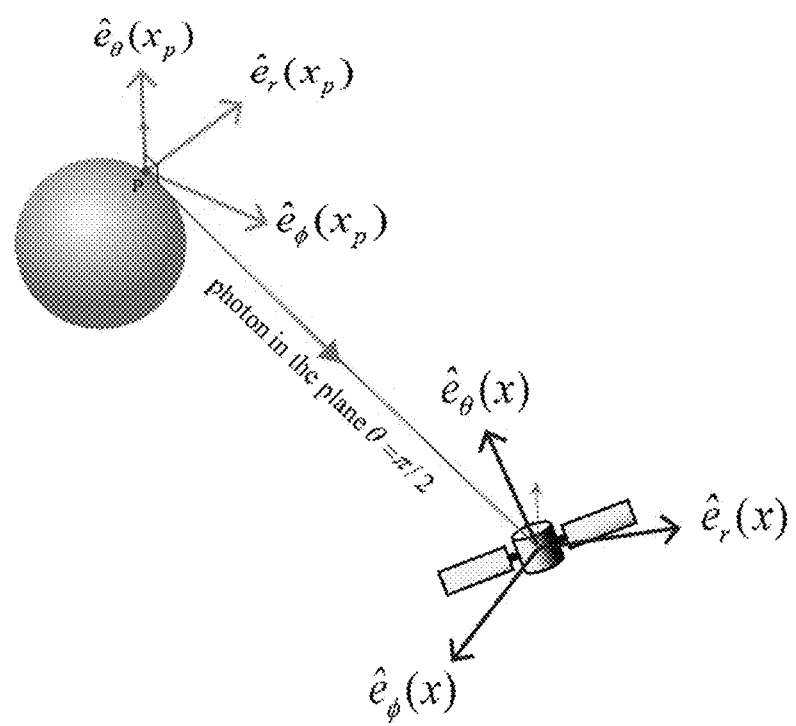
FIG. 1A shows the Earth-Satellite system and corresponding coordinates.

The present invention is described more fully hereinafter with reference to the accompanying drawings, in which example embodiments of the present invention are shown. The present invention may, however, be embodied in many different forms and should not be construed as limited to the example embodiments set forth herein. Rather, these example embodiments are provided so that this disclosure will be thorough and complete, and will fully convey the scope of the present invention to those skilled in the art. In the drawings, the sizes and relative sizes of layers and regions may be exaggerated for clarity.

Hereinafter, exemplary embodiments of the present invention will be described in detail.

Irreducible Representation of the Wigner Rotation

The Hilbert space vector of a photon is defined in a local inertial frame spanned by a tetrad, $e_{\hat{a}}^\mu(x)$, $\hat{a}$ and $\mu=0, 1, 2, 3$, which satisfies $g_{\mu\nu}(x)=\eta_{\hat{a}\hat{b}}e^{\hat{a}}_\mu(x)e^{\hat{b}}_\nu(X)$ and transforms in a way that $$\bar{e}_{\hat{a}}^\mu(\bar{x}) = \frac{\partial \bar{x}^\mu}{\partial x^\nu} e_{\hat{a}}^\nu(x)$$

and $\bar{e}_{\hat{a}}^\mu(x)=\Lambda_{\hat{a}}^{\hat{b}} e_{\hat{b}}^\mu(x)$ under general coordinate and local Lorentz transformations, respectively. A variation of a tetrad under an infinitesimal translation from x to x+δx is described by parallel transport to compare two vectors in a same tangent plane without a change of the vectors such that $$\delta(e_{\hat{a}}^\mu)=\bar{e}_{\hat{a}}^\mu(x+\delta x)-\bar{e}_{\hat{a}}^\mu(x)\to \delta x^\lambda \nabla_\lambda e_{\hat{a}}^\mu(x). \quad (1.)$$

For the case that wave vector of a photon is measured in the observer's laboratory, local covariant components of the wave vector, $k_{\hat{a}}(x)=e_{\hat{a}}^\mu(x)k_\mu(x)$, are changed along the photon's geodesic from $x^\mu$ to $x^\mu+k^\mu(x)\delta\xi$ such that $$\delta k_{\hat{a}}(x)=\delta(e_{\hat{a}}^\mu(x))k_\mu(x)+e_{\hat{a}}^\mu(x)\delta k_\mu(x); \delta k_\mu(x)=d\xi\nabla_k k_\mu(x) \quad (2.)$$

Since a photon state in curved space-time follows a null geodesic in the geometric optics limit[13,14,31] and a local infinitesimal change of a tetrad is antisymmetric[25,29], Eq(2) can be rewritten as $$k_{\hat{a}}(x)\to k'_{\hat{a}}(x)=k_{\hat{a}}(x)+\delta k_{\hat{a}}(x)=(\delta_{\hat{a}}^{\hat{b}}+\lambda_{\hat{a}}^{\hat{b}}(x)d\xi)k_{\hat{b}}(x)=\Lambda_{\hat{a}}^{\hat{b}}(x)k_{\hat{b}}(x) \quad (3.),$$

where $\lambda_{\hat{a}}^{\hat{b}}(x)=(\nabla_k e_{\hat{a}}^\nu(x))e_\nu^{\hat{b}}(x)$ In other words, the effect of an infinitesimal translation can be considered as an infinitesimal local Lorentz transformation given by $\Lambda_{\hat{a}}^{\hat{b}}(x)=\delta_{\hat{a}}^{\hat{b}}+\lambda_{\hat{a}}^{\hat{b}}(x)$. Throughout the paper, we use the hatted Latin and Greek letters for local inertial and general coordinates, respectively.

A Lorentz transformation, $\Lambda$, has the one-dimensional representations for a photon state with the helilcity, σ, given by[35]

$$U(\Lambda)|k,\sigma\rangle = \sum_{\sigma'} D_{\sigma'\sigma}(W(\Lambda,k))|\Lambda k,\sigma'\rangle \quad (4.)$$

W(Λ,k) is the Wigner's little group element, defined as $W(\Lambda,k)=L^{-1}(\Lambda k)\Lambda L(k)$ and D(W) is the irreducible representation of W. L(k) is the Lorentz transformation such that L(p)k p. Accordingly, a displacement of a photon state leads to a quantum phase called Wigner rotation angle (WRA). To get an explicit expression of the irreducible unitary representation of a Lorentz transformation, we use the canonical group homomorphism between the proper Lorentz group and its double cover, SL(2,$\mathbb{C}$); a wave vector k of a photon is mapped to a Hermitian matrix K via K $\sigma_{\hat{a}}k^{\hat{a}}$, where $\sigma_{\hat{a}}$, $\hat{a}=1, 2, 3$ are the Pauli matrices and $\sigma_{\hat{0}}$ is the 2×2 identity matrix. A Lorentz transformation is represented by the similarity transformation such that $$AKA^\dagger=\Lambda^\mu_{\ \nu}k^\nu\sigma_\mu \quad (5.)$$

with an element A of SL(2, $\mathbb{C}$). The corresponding irreducible unitary representation of the little group element for a massless particle is[32,36]

$$e^{i(\psi(\Lambda,k))} = \left(\frac{[\alpha(1+n^3)+\beta n_+]b + [\gamma(1+n^3)+\delta n_+]c^*}{a\sqrt{b(1+n^3)}}\right)^2, \quad (6.)$$

where Ψ(Λ,k) is the WRA. Detailed expressions for a, b, c, d, α, β, γ, and δ are given in the Supplementary Information (SI). Thus, A local infinitesimal Lorentz transformation, Λ(x), leads to an infinitesimal Wigner rotation (IWR) and the total Wigner rotation can be obtained by a time ordered integration of IWRs over the geodesic trajectory x(ξ) of the photon such that $$e^{i\psi(\Lambda,\hat{n})} = T\exp\left[i\int \psi\%\left(\Lambda(x(\xi)),\hat{n}^{\hat{i}}(\xi)\right)d\xi\right], \quad (7.)$$

where $n^{\hat{i}}=k^{\hat{i}}(x)/k^{\hat{0}}(x)$ and T is the time ordering operator. $\tilde{\psi}$ and ψ are infinitesimal and total WRA, respectively. In addition, it is well known that under a LT Λ, the polarization vector, $e_\phi^{\hat{a}}$, is transformed in the standard frame such that $$e_{\phi'}^{\hat{a}}=R_{\hat{z}}(\psi(\Lambda,n^{\hat{i}}))e_\phi^{\hat{a}}; \phi'=\phi+\psi(\Lambda,n^{\hat{i}}) \quad (8.)$$

In the above formula, $R_{\hat{z}}(\psi)$ represents the rotation about ẑ-axis by the total WRA.

Model

Figure 1B:
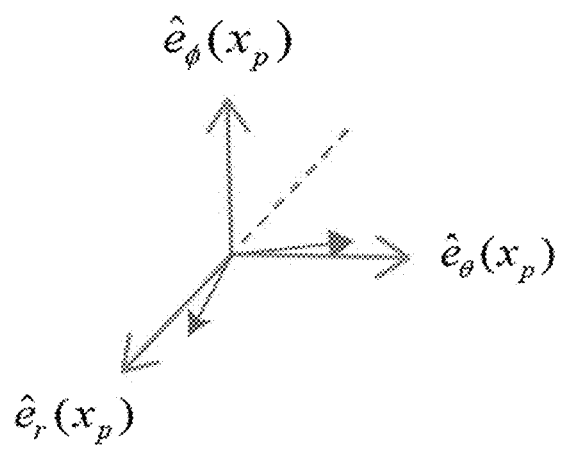
FIG. 1B shows the wave vector and polarization of photon in each local frame.
Figure 1B:
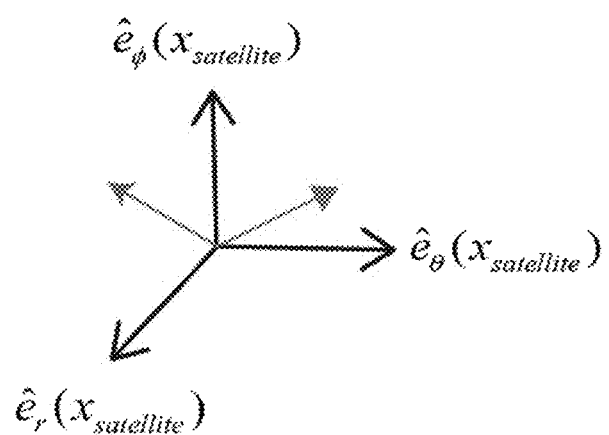
Figure 1C:
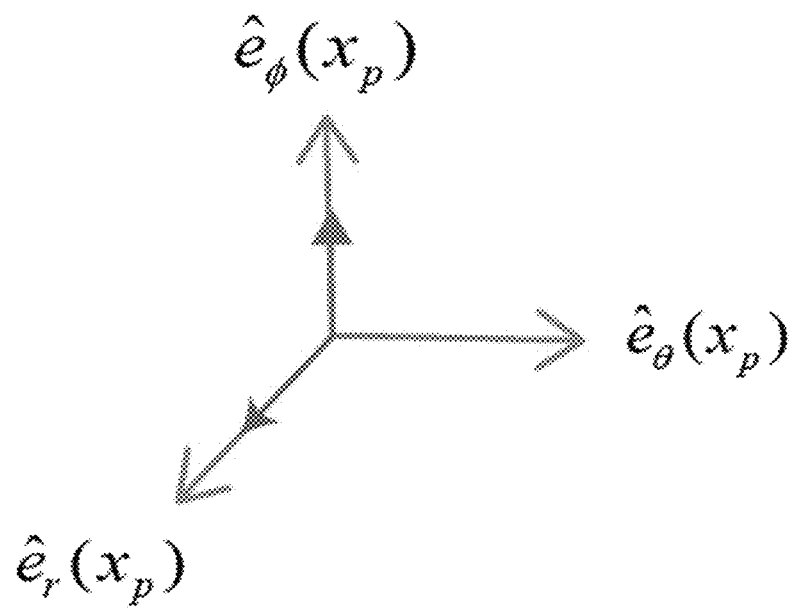
FIG. 1C shows the wave vector and polarization of photon in the standard frame in comparison with FIG. 1B.
Figure 1C:
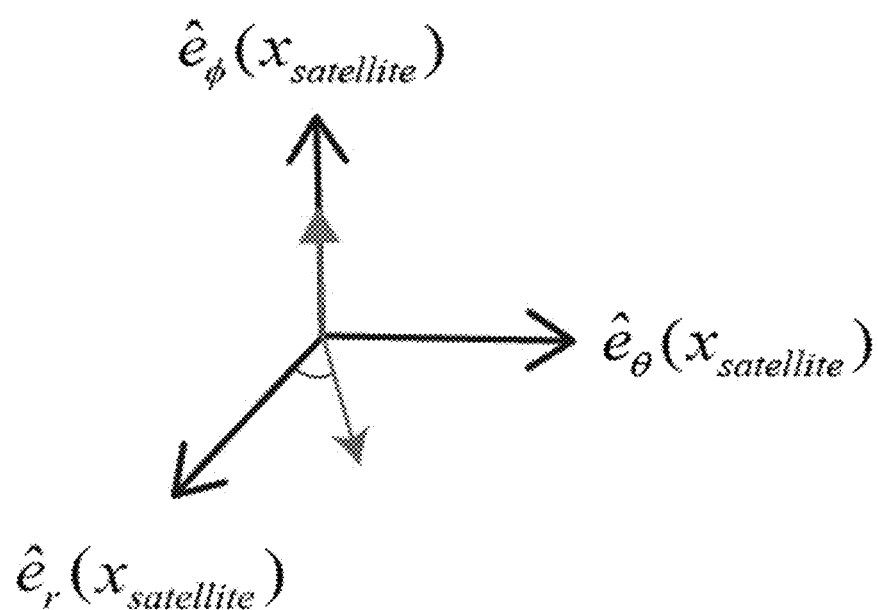
Figure 2A:
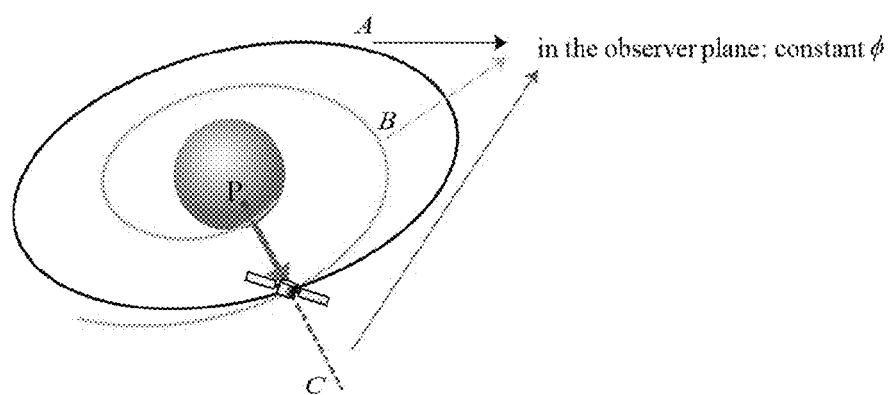
FIG. 2A and FIG. 2B show schematics of the trajectory of the observer (satellite) and photon with non-zero angular momentum in a spiraling orbit.
Figure 2B:
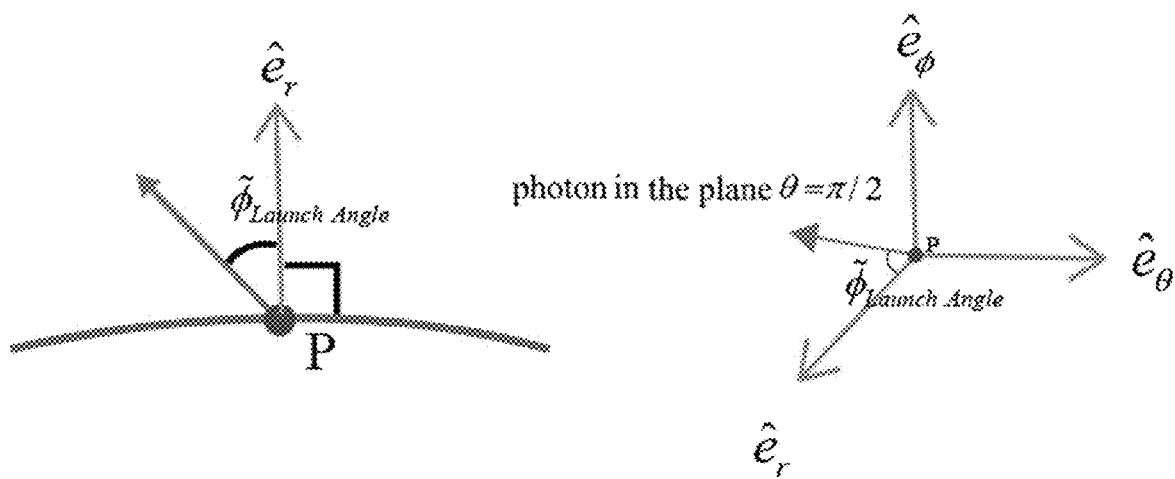

In this work, we consider an Earth-satellite system depicted in FIGS. 1A to 1C. The FIG. 1A shows the Earth-Satellite system and corresponding coordinates; A photon is sent along its geodesic, which represented by a red line, and its polarization, represented by light-green arrows, measured in the local frame of a satellite. To compare the polarizations measured at the surface of Earth and the satellite, we introduce the standard frame in which a wave vector of the photon is aligned to the third axis of observer's local frames (FIGS. 1B and 1C). We consider following four cases: a stationary observer, a radially free-falling observer, a free-falling observer with non-zero angular momentum in a circular, and spiraling orbit (FIG. 2A). We note the Wigner rotation has zero angle in special relativity if the direction of boost and a wave vector both lie in the x̂-ẑ plane, or the ŷ-ẑ plane. However, if a photon moves in the x̂-ẑ plane and an observer in the x̂-ŷ plane, WRA is not necessarily zero. Correspondingly, by the equivalence principle, all the observer is assumed to move in the plane $\hat{e}_r$-$\hat{e}_\theta$, i.e., the constant-y plane while the photon's geodesic remains in the equatorial plane (FIG. 2B). FIGS. 2A and 2B show schematics of the trajectory of the observer (satellite) and photon. The geodesics of a photon traveling lies in the constant φ-plane and the observers geodesics is lying in the equitorial plane, θ=π/2. In FIG. 2A, A, B, and C represents the geodesics of massive free-falling observers radially, in a circular orbit, and spiraling orbit, respectively. FIG. 2B shows the launching angle of a photon.

We use Schwarzschild metric to model spacetime around Earth and choose spacelike components of the tetrads so that the first, second, and third axis of the local frames become unit vectors of Schwarzschild coordinates r, θ, and φ at infinity, i.e., $\hat{e}_{\hat{a}}^\mu(x_\infty)=\hat{e}_{\hat{b}}^\mu$, where $\hat{a}=1, 2, 3$ and correspond to b=r, θ, and φ, respectively. To define non-spinning local frames, we apply Fermi-walker transport and parallel transport conditions for the stationary and free falling observers respectively. Detailed works are given in the supplementary material. It is worth to mention that, when we set the local frame based on Schwarzschild coordinates, the rotation induced by the definition of polar coordinates has to be canceled out. In other words, since the unit vector of the coordinate r, $\hat{e}_r$, is rotated as a coordinate φ changes, we choose φ-axis as the third axies of local frames to cancel out the rotation when a wave vector is aligned to φ-axis for polarization comparison. Timelike components of the corresponding tetrads, $\hat{e}_r^\mu$, are set to the 4-velocity vector of a massive particle (e.g. satellite), moving along a geodesic corresponding to each case, to describe a local frame of the observer. The 4-velocity vectors of the observers and a wave vector of the photon are obtained in terms of conserved quantities defined from killing vectors of Schwarzschild spacetime (SI #). We set conserved energy, $\varepsilon_{photon}$, of a photon to its frequency to satisfy equivalence principle and the energy per unit mass, $\varepsilon_{obs}$, of an observer to one in the unit where h=G=c=1 since $\varepsilon_{obs}=(1-r_s/r)dt/d\tau$; 1. Detailed works are given in the Supplementary Information (SI). We choose a launching angle of the photon as 45° (FIG. 2B) and an angular momentum per unit mass of the observers as $$0.4\sqrt{r_s r_{earth}}$$

so that the radial and polar components of the 4-velocity vectors have the same value in Schwarzschild coordinate, $\hat{e}_0^r(x)=\hat{e}_0^\theta(x)$, where $r_{earth}$ is the radius of Earth and $r_s$ is the Schwarzschild radius.

Results

On observation of Eq. (8), it is noted that if every parameter is real, then the result of this equation is always real. In other words, the result of Eq. (8) must be unity to avoid the imaginary Wigner angle. Accordingly, the first and second cases have zero WRAs since all the parameters are real. In the case that every parameter is not real, infinitesimal Winger rotation angle (IWA) is given by $$\tilde{\psi} = 2\,\text{Im}(\tilde{\alpha}) + \frac{2n^1}{1+n^3}\text{Im}(\tilde{\beta}) + \frac{2n^2}{1+n^3}\text{Im}(\tilde{\gamma}), \quad (9.)$$

which corresponds to the last two cases, free falling observers with angular momentum. We note that IWA consists of a classical rotation around the third axis, $2\,\text{Im}(\tilde{\alpha})$, and a quantum rotation induced by the Wigner's little group elements, $$\frac{2n^1}{1+n^3}\text{Im}(\tilde{\beta}) + \frac{2n^2}{1+n^3}\text{Im}(\tilde{\gamma}).$$

Figure 3:
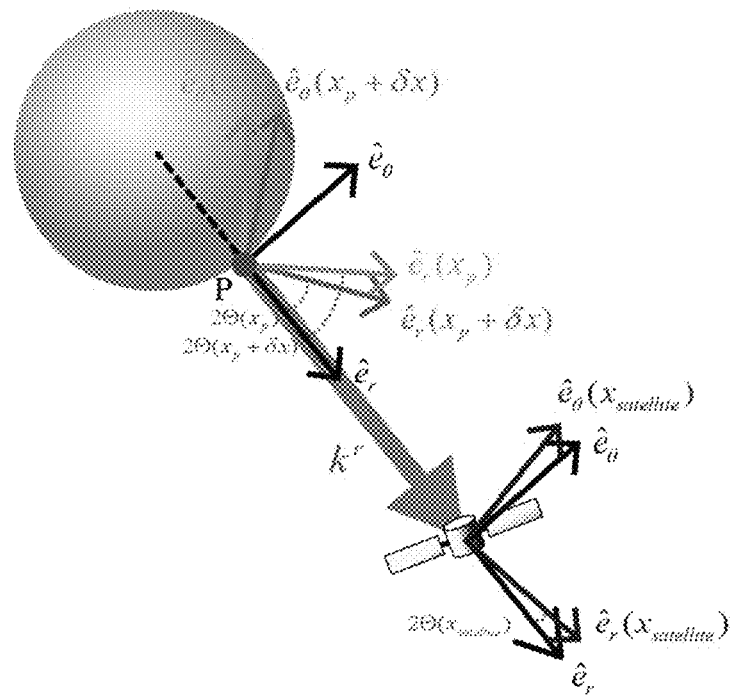
FIG. 3 shows the conceptual picture to interpret the tetrads for free falling observer with non-zero angular momentum.

For the circular-orbit case, parallel transport compensates the rotation induced by spherical coordinates such that spacelike components of the tetrads are rotated by θ when observer moves by −rθ, leading to small classical WRA. For the spiraling-orbit case, parallel-transport rotates the tetrads around the local third-axis by 2Θ(r), which is defined as $$\sin\Theta(r) \cong -\frac{l_{obs}}{\sqrt{rr_s}}\sqrt{1-\frac{r_s}{r}}, \quad (10.)$$

where $l_{obs}$ represents angular momentum per unit mass of an observer. In FIG. 3, we show the conceptual picture to interpret the classical IWA for the case of spiraling orbit. Since the leading term of classical IWA depends on only the radial component of wave vector, see SI, the system can be simplified by neglecting the angular momentum of a photon; The tetrads are rotated around $\hat{e}_\phi$ by the gravity and becomes asymtotically identical to the Schwarzschild coordinate as the photon is observed away from Earth. Accordingly, infinitesimal and total classical Wigner rotation is described by Θ(x+δx)−Θ(x) and Θ($x_{satellite}$)−Θ($x_{earth}$), respectively.

TABLE 1

| | Observer in Circular Orbit | | |
|---|---|---|---|
| Altitude | Wigner angle (classical part + quantum part) | Classical part | Quantum part |
| 300 km | 2.42e−5 | −6.46e−14 | 2.42e−5 |
| 2000 km | 9.64e−5 | −3.03e−13 | 9.64e−5 |
| 20000 km | −8.77e−7 | −7.018e−13 | −8.77e−7 |
| 36000 km | −9.93e−5 | −7.61e−13 | −9.93e−5 |
| $1.6 \times 10^{11}$ km (r = ∞) | −6.25e−4 | −8.02e−13 | −6.25e−4 |

| | Observer in Spiraling Orbit | | |
|---|---|---|---|
| Altitude | Wigner angle (classical part + quantum part) | Classical part | Classical part − Rotation of tetrad | Quantum part |
| 300 km | 1.13 | 1.16 | −1.36e−9 | 5.32e−6 |
| 2000 km | 6.30 | 6.31 | −7.71e−9 | 2.41e−6 |
| 20000 km | 24.48 | 24.48 | −2.25e−8 | −1.80e−4 |
| 36000 km | 29.31 | 29.31 | −2.40e−8 | −2.38e−4 |
| $1.6 \times 10^{11}$ km (r = ∞) | 47.15 | 47.15 | −9.15e−3 | −3.54e−4 |

Figure 4A:
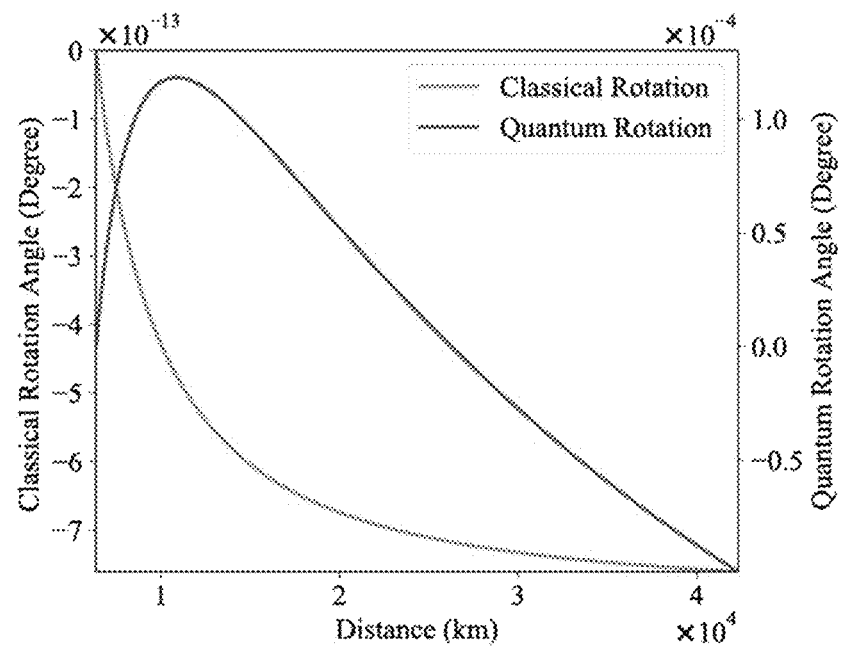
FIG. 4A and FIG. 4B show the classical part in orange solid line, the quantum part in blue solid line, and total WRA in green line for the circular orbit.
Figure 4B:
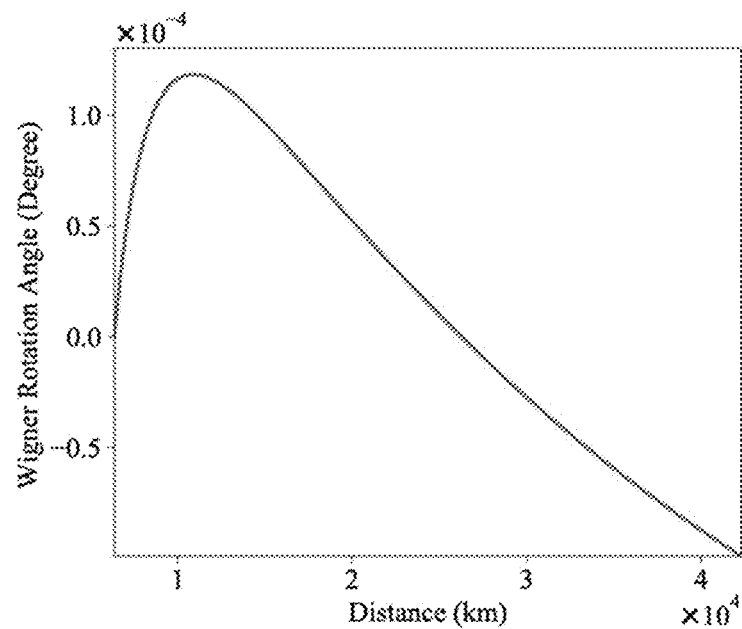
Figure 4C:
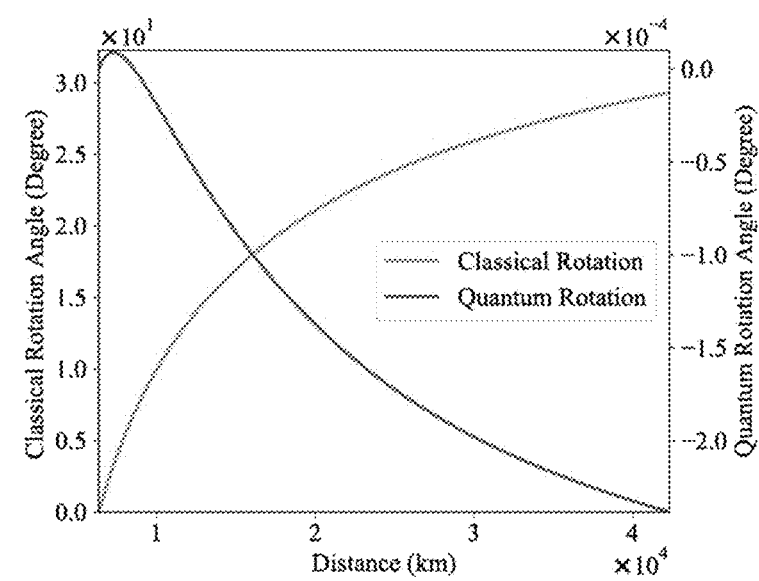
FIG. 4C and FIG. 4D show the classical part in orange solid line, the quantum part in blue solid line, and total WRA in green line for the spiraling orbit.
Figure 4D:
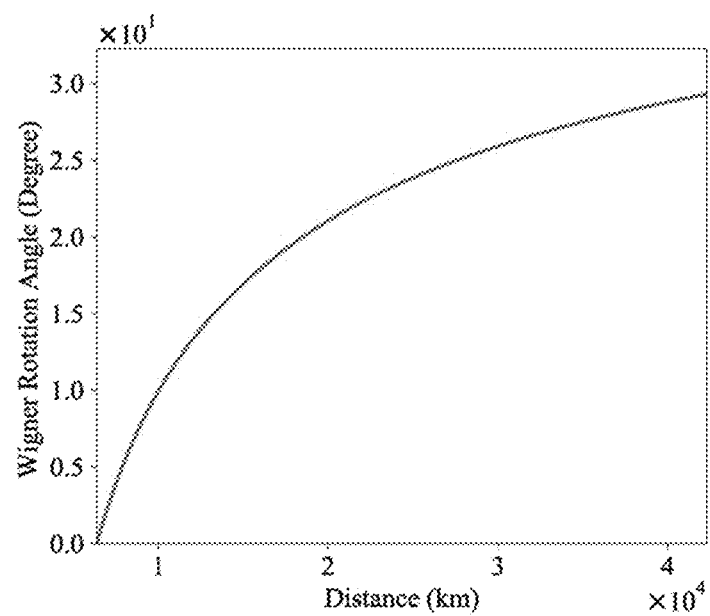
Figure 5:
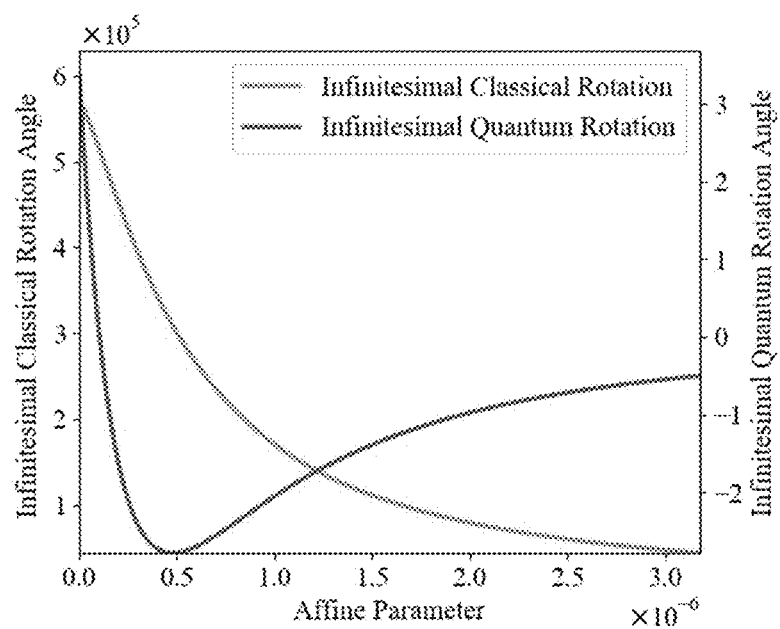
FIG. 5 shows the relationship between the infinite classical rotation and quantum rotation versus affine parameters of a free-fall observer with non-zero angular momentum for a circular orbit.

In Table 1, the rotation angles of the tetrads, classical part of IWA (general relativistic effect), 2 Im($\tilde{\alpha}$), and the quantum rotation, $$\frac{2n^1}{1+n^3}\text{Im}(\tilde{\beta}) + \frac{2n^2}{1+n^3}\text{Im}(\tilde{\gamma}),$$

are compared for circular and spiraling orbits by integrating them from the surface of Earth to the altitudes of various Earth orbits. It is confirmed that 2 Im($\tilde{\alpha}$) represents the classical rotation by the almost identical two angles, 2Θ(r) and 2 Im($\tilde{\alpha}$). Furthermore, it is shown that the circular orbit has much lesser classical angle compared to spiraling case, as mentioned above. FIGS. 4A and 4B show total WRA for the circular case. The classical part (general relativistic rotation) and the quantum part is represented by orange solid line and blue solid line, respectively. The total WRA is shown in FIG. 4B. FIGS. 4C and 4D correspond to the spiraling case. Likewise, the classical and quantum part is shown in FIGS. 4C and 4D show total WRA. For standard BB84 protocol, this corresponds to QBER (Quantum Bit Error Rate) of 1.21% in the case of the LEO and 17.2% in the case of the MEO. This is consistent with a recent analysis, showing that a near-Earth-to-space QKD systems rely on entanglement distribution of photon states could have an additional contribution to its QBER as high as 0.7% because of spacetime curvature, and these effects are observable with current technologies.

Conclusion and Discussion

In this work, we studied the Wigner rotation of a photon state in Schwarzschild spacetime to study a rotation of the polarization. The gravitational field of Earth is described by the Schwarzschild metric.[16] We calculated the wave vector of the photon to get infinitesimal local Lorentz transformations for the four cases of a stationary observer, free falling observer with zero angular momentum, and free falling observer with angular momentum in a circular and spiraling orbit. For the first two cases, the calculated Wigner angles are zeros. We calculate the non-zero Wigner angles for the last two cases in two different ways: (1) by using approximations and (2) interpolation methods for verification of our results since a differential equation for the photon's trajectory is challenging to solve analytically and the tetrads of spiraling orbits have too complex forms to find physical meanings of them. It is found that two different approaches give the same result up to 16 significant figures. The circular case results in non-zero WRA but its orders is only about $10^{-5}$ at NEO and LEO. For the spiraling case, quantum parts of WRA are 5.32×10$^{-6}$° at NEO and −3.54×10$^{-4}$° at infinity. These results are significantly larger than previous classical estimations. Furthermore, the total Wigner rotations have angles of 1.13504° at NEO and 47.1469° at infinity and expected to contribute QBER 1.21 and 17.2% to the quantum bit error rate in the case of LEO and MEO, respectively. It is also interesting to compare these results with the works by Connors et al., who estimated the polarization rotation angle of 82° at infinity from the X-rays near black hole in Cygnus X-1 by using the general relativistic calculations. We believe our work would pave the road to test the gravitational effects on the quantum system.

Supplementary Material for Energy of Photon with the Affine Parameter Used in this Specification (SI)

In general relativity, it is well known that the Lagrangian, L, can be chosen in the form (l)

$$\frac{1}{2}\left(\frac{ds}{d\xi}\right)^2 \tag{S1}$$

with the line element for the Schwarzschild metric, which is defined as follows $$ds^2 = -\left(1 - \frac{r_s}{r}\right)^2 dt^2 + \left(1 - \frac{r_s}{r}\right)^{-1} dr^2 + r^2 d\theta^2 + r^2\sin^2\theta d\phi^2. \tag{S2}$$

If the Lagrangian has no dependence on specific coordinates ($x^\mu$), the equations of motion imply the conservation of some quantities. Specifically, the equations of motion are written below as $$\frac{d}{d\tau}\left(\frac{\partial L}{\partial(dx^\mu/d\xi)}\right) = \frac{dL}{dx^\mu} = 0. \tag{S3}$$

From the above equation, the following identities hold, such as $$\frac{\partial L}{\partial(dx^\mu/d\xi)} = \tag{S4}$$

$$g_{\mu\beta}\frac{dx^\beta}{d\xi} = g_{\alpha\beta}\delta^\alpha_\mu\frac{dx^\beta}{d\xi} = g_{\mu\beta}\frac{\partial x^\alpha}{\partial x^\mu}\frac{dx^\beta}{d\xi} = \frac{\partial}{\partial x^\mu}\cdot\frac{dx}{d\xi} = const.$$

In Schwarzschild spacetime, the time and azimuthal components of wave vector, $k^t$, $k^\phi$, are constant, since time t, and azimuthal angle, φ, are cyclic coordinates in the metric. Therefore, from equation (S4), following two conserved quantities e and l are defined as (l)

$$e \equiv -\frac{\partial}{\partial t}\cdot\frac{dx}{d\xi} = \left(1 - \frac{r_s}{r}\right)\frac{dt}{d\xi}, l \equiv -\frac{\partial}{\partial\phi}\cdot\frac{dx}{d\xi} = r^2\sin^2\theta\frac{d\phi}{d\xi}. \tag{S5}$$

Here, these two conserved quantities are called energy per unit rest mass e at very large r, the distance from the origin and angular momentum per unit rest mass at very low velocities, l, respectively. For brevity, we call 'e' the energy and 'l' the angular momentum in this paper. For a photon, the geodesic equation in the Schwarzschild metric can be rewritten as $$-\frac{e_{ph}^2}{\left(1-\frac{r_s}{r}\right)} + \frac{1}{\left(1-\frac{r_s}{r}\right)}\left(\frac{dr}{d\xi}\right)^2 + \frac{l_{ph}}{r^2} = 0, \tag{S6}$$

$$\left(\frac{dr}{d\xi}\right)^2 = -\sqrt{e_{ph}^2 - \frac{l_{ph}}{r^2}\left(1-\frac{r_s}{r}\right)} = -e_{ph}\sqrt{1 - \frac{b_{ph}^2}{r^2}\left(1-\frac{r_s}{r}\right)}, \tag{S7}$$

since all of the wave vectors of massless particles are null vectors. In other words, we can get the explicit form of wave vectors and corresponding dual vectors:

$$k^\mu(x) = \left(\frac{e_{ph}}{1-\frac{r_s}{r}}, -e_{ph}\sqrt{1 - \frac{b_{ph}^2}{r^2}\left(1-\frac{r_s}{r}\right)}, \frac{e_{ph}b_{ph}}{r^2}, 0\right) \tag{S8}$$

$$k_\mu(x) = \left(-e_{ph}, -\frac{e_{ph}}{1-\frac{r_s}{r}}\sqrt{1-\frac{b_{ph}^2}{r^2}\left(1-\frac{r_s}{r}\right)}, e_{ph}b_{ph}, 0\right) \quad (S9)$$

By the Equivalence principle, wave vectors in the local inertial frame, which is defined with radially free falling tetrads, should have the same form with wave vectors in flat spacetime, which is as follows $$k_{\hat{a}}(x) = (-\omega, k_{\hat{1}}, k_{\hat{2}}, k_{\hat{3}}) \text{ where } \omega\sqrt{=(k_{\hat{1}})^2 + (k_{\hat{2}})^2 + (k_{\hat{3}})^2}. \quad (S10)$$

In other words, inner product of wave vector with the time component of tetrads should be the same as the angular frequency of a photon in flat spacetime, $$k_{\hat{0}}(x) = -\frac{e_{ph}}{1-\frac{r_s}{r}}\left(1 - \sqrt{\frac{r_s}{r}}\sqrt{1-\frac{b_{ph}^2}{r^2}\left(1-\frac{r_s}{r}\right)}\right) \cong \quad (S11)$$

$$-e_{ph}\left(1 + \frac{r_s}{r} - \sqrt{\frac{r_s}{r}}\sqrt{1-\frac{b_{ph}^2}{r^2}\left(1-\frac{r_s}{r}\right)}\right) = -\omega.$$

Therefore, we conclude that photon's energy is the same as the frequency of the photon, measured at the r=∞.

Parameter Dependences of the Wigner Rotation

A Hermitian matrix K, corresponding to each wave vector k of the photon, is defined as (2, 3)

$$K = \sigma_a k^a \quad (S12)$$

where $\sigma_0$ is the 2×2 Identity matrix, and $\sigma_i$ (i=1, 2, 3) are the Pauli matrices. Therefore, K has the form (2,3)

$$K = k^0 \begin{pmatrix} n^3 & n^1 - in^2 \\ n^1 + in^2 & n^3 \end{pmatrix} \text{ where } n^i = \frac{k^i}{k^0} (i=1, 2, 3). \quad (S13)$$

Then, there is a matrix A in SL(2, C) for any Lorentz transformation such that $$K' = \Lambda^a{}_b k^b \sigma_a = AKA^\dagger \quad (S14)$$

Since A is the elements of SL(2, C), it can be represented as $$A = \begin{pmatrix} \alpha & \beta \\ \gamma & \delta \end{pmatrix} \quad (S15)$$

with unit determinant, i.e., $\alpha\delta - \gamma\beta = 1$. For the Wigner's little group element (2-4) $W(\Lambda,k) = L_{\Lambda k}^{-1}\Lambda L_k$, we can define a matrix corresponding matrix $S(\Lambda,k)$ in SL(2, C) such that $W(\Lambda,k) = \Lambda(S(\Lambda,k))$ and $$S(\Lambda,k) = A^{-1}{}_k A A_k \quad (S16)$$

where $A_k$ corresponds to L(k) that $\tilde{k}$ is transformed into k. Here, $\tilde{k} = (1,0,0,1)$ $A_k$ has the form $$A_k = \frac{1}{\sqrt{2k^0(1+n^3)}}\begin{pmatrix} k^0(1+n^3) & -n_- \\ k^0 n_+ & 1+n^3 \end{pmatrix}. \quad (S17)$$

If K' is written by $$K' = \quad (S18)$$
$$k'^0\begin{pmatrix} 1+n'^3 & n'_- \\ n'_+ & 1-n'^3 \end{pmatrix} = AKA^\dagger = k^0\begin{pmatrix} b & c^* \\ c & a-b \end{pmatrix} \text{ where } A = \begin{pmatrix} \alpha & \beta \\ \gamma & \delta \end{pmatrix}$$

$\in$ SL(2, C), then we get the following relations after some mathematical manipulations $$a = (|\alpha|^2 + |\gamma|^2)(1+n^3) + \quad (S19)$$
$$(|\beta|^2 + |\delta|^2)(1-n^3) + (\alpha\beta^* + \gamma\delta^*)n_- + (\alpha^*\beta + \gamma^*\delta)n_+$$

$$b = |\alpha|^2(1+n^3) + |\beta|^2(1-n^3) + \alpha\beta^* n_- + \alpha^*\beta n_+ \quad (S20)$$

$$c = \alpha^*\gamma(1+n^3) + \beta^*\delta(1-n^3) + \beta^*\gamma n_- + \alpha^*\delta n_+ \quad (S21)$$

$$k'^0 = \frac{a}{2}k^0, \quad n'^3 = \frac{2b}{a} - 1, \quad n'_+ = \frac{2c}{a}. \quad (S22)$$

Then $S(\Lambda,k)$ has the form $$S = \begin{pmatrix} e^{i\psi/2} & z \\ 0 & e^{-i\psi/2} \end{pmatrix} \quad \psi \in [0, 4\pi] \quad (S23)$$

by direct calculation. Here, z is an arbitrary complex number. Substituting the equation (S20), in terms of a, b, $\alpha$, $\beta$, $\gamma$, $\delta$, into the equation (S18) we get the relation (2)

$$e^{i(\psi(\Lambda,k)/2)} = \frac{[\alpha(1+n^3) + \beta n_+]b + [\gamma(1+n^3) + \delta n_+]c^*}{a\sqrt{b(1+n^3)}}. \quad (S24)$$

Moreover, the matrix S can be rewritten in the form $$S = \begin{pmatrix} e^{i\psi/2} & e^{-i\psi/2}z \\ 0 & e^{-i\psi/2} \end{pmatrix}, \psi \in [0, 4\pi] \quad (S25)$$

The product of any two elements in this group becomes $$S_1 S_2 = \begin{pmatrix} e^{-i(\psi_1+\psi_2)/2} & e^{-i(\psi_1+\psi_2)/2}(z_1 + e^{i\psi_1}z_2) \\ 0 & e^{-i(\psi_1+\psi_2)/2} \end{pmatrix}, \psi \in [0, 4\pi]. \quad (S26)$$

In other words, we have the following composition law such that $$(z_1, \psi_1)(z_2, \psi_2) = (z_1 + \exp(i\psi_1)z_2, \psi_1 + \psi_2). \quad (S27)$$

Thus, this group is the E(2) group.

There are two classes of the irreducible unitary representations of the E(2). One is the infinitesimal dimension representations and the other is the one-dimension representations. However, the former has intrinsic continuous degrees of freedom. Therefore, the Lorentz transformation for the photon has the one-dimension representations, since the photon is not observed to have any continuous degrees of freedom. The representations have the form (4)

$$U(\Lambda)|k,\sigma\rangle = e^{i\sigma\psi(\Lambda,k)}|\Lambda k,\sigma\rangle. \quad (S28)$$

Here, $\psi(\Lambda,k)$ is the Wigner angle. When equation (S26) is expanded to the first order of $d\xi$ in the form $$e^{i\psi(\Lambda,k)/2} \sim 1 + i\tilde{\psi}(\Lambda,k)\frac{d\xi}{2}, \tag{S29}$$

the finite Wigner rotations can be built up as a time ordered integration of infinitesimal Wigner rotations over the geodesic trajectory $x(\xi)$ of the photon via $$e^{i\psi(\Lambda,\vec{n})/2} = T\exp\left[i\int \tilde{\psi}(\Lambda(\xi),\vec{n}(\xi))\frac{d\xi}{2}\right] \tag{S30}$$

where $\vec{n}(\xi) = \vec{n}(x(\xi))$, $\Theta^\mu_{\ \nu}(\xi) = \iota^\mu_{\ \nu}(x(\xi))$ and T is the time order operator.

If the homogeneous Lorentz transformation is expressed as $\Lambda^a_{\ b} = \delta^a_{\ b} + \omega^a_{\ b}$, the Wigner angle is related to $\omega^\mu_{\ \nu}$. To see this, we expand A in terms of $d\xi$ as $$A = \begin{pmatrix} \alpha & \beta \\ \gamma & \delta \end{pmatrix} = I + \tilde{A}d\xi = I + \begin{pmatrix} \tilde{\alpha} & \tilde{\beta} \\ \tilde{\gamma} & \tilde{\delta} \end{pmatrix}d\xi. \tag{S31}$$

By the condition that the A has unit determinant, $\tilde{\delta} = -\tilde{\alpha}$. In other words, the A is expanded in the form $$A = \begin{pmatrix} \alpha & \beta \\ \gamma & \delta \end{pmatrix} = I + \tilde{A}d\xi = I + \begin{pmatrix} \tilde{\alpha} & \tilde{\beta} \\ \tilde{\gamma} & -\tilde{\alpha} \end{pmatrix}d\xi. \tag{S32}$$

Substituting the equation (S32) into the equation (S19), multiplying $\sigma_a$ both sides, and then taking a trace on both sides, we can get the following equations by the relation $$tr(\sigma_a\sigma_b) = 2\delta_{ab}$$

$$\omega^a_{\ b} = \frac{1}{2}\delta^{ac}tr(\sigma_b\sigma_c\tilde{A} + \sigma_c\sigma_b\tilde{A}^\dagger) \tag{S33}$$

where $tr(A)$ is the trace of A. From the equation (S33), we obtain $$\tilde{\alpha} = \frac{1}{2}(\omega^0_{\ 3} + i\omega^1_{\ 2})$$

$$\tilde{\beta} = \frac{1}{2}[(\omega^0_{\ 1} - \omega^3_{\ 1}) + i(\omega^0_{\ 2} + \omega^2_{\ 3})]$$

$$\tilde{\gamma} = \frac{1}{2}[(\omega^0_{\ 1} - \omega^3_{\ 1}) - i(\omega^0_{\ 2} - \omega^2_{\ 3})]. \tag{S34}$$

Real Parameters

The $\alpha, \beta, \gamma, \delta, |\beta|^2, |\gamma|^2, |\delta|^2$ have the following forms by the definition $$\alpha = 1 + \tilde{\alpha}d\xi,$$

$$\beta = \tilde{\beta}d\xi,$$

$$\gamma = \tilde{\gamma}d\xi,$$

$$\delta = 1 - \tilde{\alpha}d\xi,$$

$$|\alpha|^2 = 1 + 2\tilde{\alpha}d\xi,$$

$$|\beta|^2 = 0,$$

$$|\gamma|^2 = 0,$$

$$|\delta|^2 = 1 - 2\tilde{\alpha}d\xi. \tag{S35}$$

Substituting $n_\pm = n^1$ into equations (S19), (S20), and (S21), we obtain $$a = 2 + 2(2\tilde{\alpha}n^3 + (\tilde{\beta} + \tilde{\gamma})n^1)d\xi, \tag{S36}$$

$$b = (1+n^3) + 2(2\tilde{\alpha}(1+n^3)\tilde{\beta}n^1)d\xi. \tag{S37}$$

and $c = n^1 + (\tilde{\gamma}(1+n^3) + \tilde{\beta}(1-n^3))d\xi. \tag{S38}$

In this work, we have calculated to the first order of $d\xi$. Using these parameters, the numerator of equation (S25) has the form $$[\alpha(1+n^3)+\beta n_+]b + [\gamma(1+n^3)+dn_+]c^* = 2(1+n^3) + [2\tilde{\alpha} + 6\tilde{\alpha}n^3 + 4\alpha(n^3)^2 + 4\beta n^1 + 2\beta n^1 n^3 + 2\tilde{\gamma}n^1 + 2\tilde{\gamma}n^1 n^3]d\xi. \tag{S39}$$

We also have $$\frac{1}{a\sqrt{b(1+n^3)}} = \tag{S40}$$

$$\frac{1}{2(1+n^3)} - \frac{2\tilde{\alpha}n^3 + \tilde{\beta}n^1 + \tilde{\gamma}n^1 + 2\tilde{\alpha} + 2\tilde{\beta}n^1(1+n^3)^{-1}}{2(1+n^3)}d\xi.$$

By direct calculations, one can show that equation (S29) becomes $$e^{i(\psi(\Lambda,k)/2)} = 1. \tag{S41}$$

Therefore, it is evident that the observer who is at rest and falling free with zero angular momentum sees no Wigner rotation.

Complex Parameters

In the case that every parameter is not real, $|\alpha|^2, |\beta|^2, |\gamma|^2, |\delta|^2$ have the form $$|\alpha|^2 = 1 + 2Re(\tilde{\alpha})d\xi$$

$$|\beta|^2 = 0$$

$$|\gamma|^2 = 0$$

$$|\gamma\delta|^2 = 1 - 2Re(\tilde{\alpha})d\xi \tag{S42}$$

where $Re(\tilde{\alpha})$ is the real part of the complex number $\tilde{\alpha}$. Equations (S19), (S20), and (S21) are then rewritten $$a = (|\alpha|^2 + |\gamma|^2)(1+n^3) + (|\beta|^2 + |\delta|^2)(1-n^3) + (\alpha\beta^* + \gamma\delta^*)n_- + \tag{S43}$$
$$(\alpha^*\beta + \gamma^*\delta)n_+ = 2 + [4n^3Re(\tilde{\alpha}) + 2Re(\tilde{\beta}n_+ + \tilde{\gamma}n_-)]d\xi$$

$$b = |\alpha|^2(1+n^3) + |\beta|^2(1-n^3) + \alpha\beta^*n_- + \alpha^*\beta n_+ \tag{S44}$$
$$= (1 + 2Re(\tilde{\alpha})d\xi)(1+n^3) + 2Re(\tilde{\beta}n_+)d\xi$$
$$= (1+n^3) + [2Re(\tilde{\alpha})(1+n^3) + 2Re(\tilde{\beta}n_+)]d\xi,$$

and $$c = \alpha^*\gamma(1+n^3)\beta^*\delta(1-n^3) + \beta^*\gamma n_- + \alpha^*\delta n_+ \tag{S45}$$
$$= \tilde{\gamma}(1+n^3)d\xi + \tilde{\beta}^*(1-n^3)d\xi + (1+\tilde{\alpha}^*d\xi)(1-\tilde{\alpha}d\xi)n_+$$
$$= n_+ + [\tilde{\gamma}(1+n^3) + \tilde{\beta}^*(1-n^3) - 2in_+Im(\tilde{\alpha})]d\xi.$$

where $Im(\tilde{\alpha})$ is the imaginary part of the complex number $\tilde{\alpha}$.

From above equations, we obtain $$[\alpha(1+n^3)+\beta n_+]b + [\gamma(1+n^3)+\delta n_+]c^* = ((1+n^3) + [\bar{\alpha}(1+n^3)+\bar{\beta}n_+]d\xi)((1+n^3) + \tag{S46}$$
$$[2\mathrm{Re}(\tilde{\alpha})(1+n^3) + 2\mathrm{Re}(\tilde{\beta}n_+)]d\xi) + (n_+ + [\tilde{\gamma}(1+n^3) - \tilde{\alpha}n_+]d\xi)(n_- + [\tilde{\gamma}^*(1+n^3) + \tilde{\beta}(1-n^3) + 2in_-\mathrm{Im}(\tilde{\alpha})]d\xi) =$$
$$(1+n^3)^2 + n_+ n_- + \Big[\tilde{\alpha}(1+n^3)^2 + \tilde{\beta}n_+(1+n^3) + 2\mathrm{Re}(\tilde{\alpha})(1+n^3)^2 + 2\mathrm{Re}(\tilde{\beta}n_+)(1+n^3) - \tilde{\alpha}n_+n_- + 2\mathrm{Re}(\tilde{\gamma}^*n_+)(1+n^3) + \tilde{\beta}n_+(1-n^3) +$$
$$2in_+n_-\mathrm{Im}(\tilde{\alpha})\Big]d\xi = 2(1+n^3) + [2\tilde{\alpha}n^3(1+n^3) + 2\tilde{\beta}n_+ + 2\mathrm{Re}(\tilde{\alpha})(1+n^3)^2 + 2\mathrm{Re}(\tilde{\beta}n_+)(1+n^3) + \mathrm{Re}(\tilde{\gamma}^*n_+)(1+n^3) + 2in_+n_-\mathrm{Im}(\tilde{\alpha})]d\xi =$$
$$2(1+n^3)\Bigg(1 + \Bigg[\frac{(2\tilde{\alpha}n^3(1+n^3) + 2\tilde{\beta}n_+ + 2\mathrm{Re}(\tilde{\alpha})(1+n^3)^2 + 2\mathrm{Re}(\tilde{\beta}\widetilde{n}_+)(1+n^3) + \mathrm{Re}(\tilde{\gamma}^*n_+)(1+n^3) + 2in_+n_-\mathrm{Im}(\tilde{\alpha})}{(2(1+n^3))}d\xi\Bigg]\Bigg)$$

and $$\frac{1}{a\sqrt{b(1+n^3)}} = \frac{1}{(2+[4n^3\mathrm{Re}(\tilde{\alpha})+2\mathrm{Re}(\tilde{\beta}n_++\tilde{\gamma}n_-)]d\xi)\sqrt{(1+n^3)^2 + [2\mathrm{Re}(\tilde{\alpha})(1+n^3)^2 + 2\mathrm{Re}(\tilde{\beta}n_+)(1+n^3)]d\xi}} = \tag{S47}$$

$$\frac{1}{2}\Bigg(1 - \frac{[4n^3\mathrm{Re}(\tilde{\alpha})+2\mathrm{Re}(\tilde{\beta}n_++\tilde{\gamma}n_-)]}{2}d\xi\Bigg)\frac{1}{(1+n^3)}\frac{1}{\sqrt{1+\frac{[2\mathrm{Re}(\tilde{\alpha})(1+n^3)+2\mathrm{Re}(\tilde{\beta}n_+)]d\xi}{(1+n^3)}}} =$$

$$\frac{1}{2(1+n^3)}\Bigg(1 - \frac{[4n^3\mathrm{Re}(\tilde{\alpha})(1+n^3) + 2\mathrm{Re}(\tilde{\beta}n_+ + \tilde{\gamma}n_-)(1+n^3)]}{2(1+n^3)}d\xi\Bigg)\Bigg(1 - \frac{[2\mathrm{Re}(\tilde{\alpha})(1+n^3)+2\mathrm{Re}(\tilde{\beta}n_+)]}{2(1+n^3)}d\xi\Bigg)$$

In the previous section, we proved real components of the parameters lead Eq. (S41) to one.

Substituting these results into (S41), we have the form $$e^{i(\psi(\wedge,k)/2)} = \frac{[\alpha(1+n^3)+\beta n_+]b + [\gamma(1+n^3)+\delta n_+]c^*}{a\sqrt{b(1+n^3)}} = \Bigg(1 - \frac{[4n^3\mathrm{Re}(\tilde{\alpha})(1+n^3)+2\mathrm{Re}(\tilde{\beta}n_++\tilde{\gamma}n_-)(1+n^3)]}{2(1+n^3)}d\xi\Bigg) \tag{S48}$$

$$\Bigg(1 - \frac{[2\mathrm{Re}(\tilde{\alpha})(1+n^3)+2\mathrm{Re}(\tilde{\beta}n_+)]}{2(1+n^3)}d\xi\Bigg)\Bigg(1 + \Bigg[\frac{(2\tilde{\alpha}n^3(1+n^3)+2\tilde{\beta}n_++2\mathrm{Re}(\tilde{\alpha})(1+n^3)^2+2\mathrm{Re}(\tilde{\beta}n_+)(1+n^3)+\mathrm{Re}(\tilde{\gamma}^*n_+)(1+n^3)+2in_+n_-\mathrm{Im}(\tilde{\alpha})}{2(1+n^3)}d\xi\Bigg]\Bigg) =$$

$$1 + \frac{1}{2(1+n^3)}\Big[-4n^3\mathrm{Re}(\tilde{\alpha})(1+n^3) - 2\mathrm{Re}(\tilde{\beta}n_++\tilde{\gamma}n_-)(1+n^3) - 2\mathrm{Re}(\tilde{\alpha})(1+n^3) - 2\mathrm{Re}(\tilde{\beta}n_+) +$$

$$2\tilde{\alpha}n^3(1+n^3) + 2\tilde{\beta}n_+ + 2\mathrm{Re}(\tilde{\alpha})(1+n^3)^2 + 2\mathrm{Re}(\tilde{\beta}n_+)(1+n^3) + \mathrm{Re}(\tilde{\gamma}^*n_+)(1+n^3) + 2in_+n_-\mathrm{Im}(\tilde{\alpha})\Big]d\xi =$$

$$1 + \frac{1}{2(1+n^3)}\Big[-2\mathrm{Re}(\tilde{\beta}n_++\tilde{\gamma}n_-)(1+n^3) - 2\mathrm{Re}(\tilde{\beta}n_+) + 2\tilde{\beta}n_+ + 2\mathrm{Re}(\tilde{\beta}n_+)(1+n^3) + \mathrm{Re}(\tilde{\gamma}^*n_+)(1+n^3) + 2i(1+n^3)\mathrm{Im}(\tilde{\alpha})\Big]d\xi$$

Therefore, we can conclude Eq. (S47) has the form $$\frac{1}{a\sqrt{b(1+n^3)}}[\alpha(1+n^3)+\beta n_+]b + [\gamma(1+n^3)+dn_+]c^* = \tag{S49}$$

$$1 + i[\mathrm{Re}(\tilde{\beta})\frac{n^{\hat{2}}}{1+n^3} + \mathrm{Im}(\tilde{\beta})\frac{n^{\hat{1}}}{1+n^3} + \mathrm{Im}(\tilde{\alpha})d\xi.$$

By the definition, the infinitesimal Wigner angle is $$\tilde{\psi} = 2\mathrm{Im}(\tilde{\alpha}) + \frac{2n^{\hat{1}}}{1+n^3}\mathrm{Im}(\tilde{\beta}) + \frac{2n^{\hat{2}}}{1+n^3}\mathrm{Im}(\tilde{\gamma}) \tag{S50}$$

Tetrads for Stationary Observer

The tetrads, $e_a{}^\mu(x)$, are defined as (5, 6)

$$g_{\mu\nu}(x)e_a{}^\mu(x)\cdot e_b{}^\nu(x) = \eta_{ab}. \tag{S51}$$

For a stationary observer (Bob), his local frame is defined mathematically with the following tetrads in Schwarzschild spacetime, $$(e_0)^\mu(x) = (e_t)^\mu(x) = (1/(1-r_s/r)^{1/2},0,0,0)$$

$$(e_1)^\mu(x) = (e_r)^\mu(x) = (0,(1-r_s/r)^{1/2},0,0)$$

$$(e_2)^\mu(x) = (e_\theta)^\mu(x) = (0,0,1/r,0)$$

$$(e_3)^\mu(x) = (e_\phi)^\mu(x) = (0,0,0,1/r). \tag{S52}$$

This tetrad represents a static local inertial frame at each point, since all the components are independent of time and spatial components of the timelike tetrad, $e_i{}^t(x)$ where $i=1, 2, 3$, and the time components of spacelike tetrads, $e_o{}^a(x)$ where $\alpha = r, \theta, \varphi$, are zero. The corresponding ILLT(Infinitesimal Local Lorentz Transformation) matrix is given by $$(\omega_b^a) = \begin{pmatrix} 0 & -\frac{k^t r_s}{2r^2} & 0 & 0 \\ -\frac{k^t r_s}{2r^2} & 0 & -k^\theta(1-\frac{r_s}{r})^{1/2} & 0 \\ 0 & k^\theta(1-\frac{r_s}{r})^{1/2} & 0 & 0 \\ 0 & 0 & 0 & 0 \end{pmatrix}. \quad (S53)$$

It is easy to see all the parameters, defined in Eq. (S34), are real with this ILLT matrix.

Therefore, Bob at rest cannot observe non-zero Wigner rotation angle.

Tetrads for Free Falling Observer with Zero Angular Momentum

The observer starts from rest at infinity and fall radially inward. The observer's energy and angular momentum, defined in equation (S5), are 1 and 0, respectively. [Hartle] Thus, the timelike component of 4-velocity vector is $(1-r_s/r)^{-1}$ and the component of $\phi$-direction of 4-veclocity vector is zero. The component of $\theta$-direction is also zero, since we assume that observer travels in the plane $\theta = \pi/2$. By substituting the component of t-direction into the following equation, $$-(1-\frac{r_s}{r})\left(\frac{dt}{d\xi}\right)^2 + (1-\frac{r_s}{r})^{-1}\left(\frac{dr}{d\xi}\right)^2 = -1, \quad (S54)$$

we can obtain the component of r-direction. In this case, the ILLT matrix is given by $$(\omega_b^a) = \begin{pmatrix} 0 & -\frac{k^t r_s}{2r^2} - \sqrt{\frac{r_s}{r}}\frac{k^r}{2r(1-\frac{r_s}{r})} & k^\theta\sqrt{\frac{r_s}{r}} & 0 \\ -\frac{k^t r_s}{2r^2} - \sqrt{\frac{r_s}{r}}\frac{k^r}{2r(1-\frac{r_s}{r})} & 0 & k^\theta & 0 \\ k^\theta\sqrt{\frac{r_s}{r}} & -k^\theta & 0 & 0 \\ 0 & 0 & 0 & 0 \end{pmatrix}. \quad (S55)$$

Tetrads for Free Falling Observers with Non-Zero Angular Momentum I (Spiral Orbit)

In this case, we also assume that e=1[Hartle]. The observer, who is falling free with angular momentum has the 4-velocity vector such that $$u(\tau) = (e_{\hat{t}})^\mu(x) = (1/(1-r_s/r), u^r, 0, \frac{l}{r^2}) \quad (S56)$$

where $$u^r = -\left(\frac{r_s}{r} - \frac{l^2}{r^2}(1-\frac{r_s}{r})\right)^{1/2}. \quad (S57)$$

One of the sets of the tetrads for free falling observer with non-zero angular momentum is as follows $$(e_{\hat{0}})^\mu(x) = (e_t)^\mu(x) = (\frac{1}{(1-\frac{r_s}{r})}, -\sqrt{\frac{r_s}{r}}\cos\Theta(r), -\frac{1}{r}\sqrt{\frac{r_s}{r}}\frac{\sin\Theta(r)}{1-\frac{r_s}{r}}, 0) \quad (S58)$$

$$(e_{\hat{1}})^\mu(x) = (-\sqrt{\frac{r_s}{r}}\frac{1}{(1-\frac{r_s}{r})}, \cos\Theta(r), \frac{1}{r}\frac{\sin\Theta(r)}{\sqrt{1-\frac{r_s}{r}}}, 0)$$

$$(e_{\hat{2}})^\mu(x) = (0, -\sin\Theta(r)\sqrt{1-\frac{r_s}{r}}, \frac{1}{r}\cos\Theta(r), 0)$$

$$(e_{\hat{3}})^\mu(x) = (e_\phi)^\mu(x) = (0, 0, 0, 1/r)$$

where $\cos\Theta(r) = \sqrt{\left(1-\frac{l^2}{rr_s}(1-\frac{r_s}{r})\right)}$, $\sin\Theta(r) = -\sqrt{\frac{l^2}{rr_s}(1-\frac{r_s}{r})}$.

With the orthogonality condition, these tetrads can be rewritten more generally as $$(e_{\hat{0}})^\mu(x) = (e_t)^\mu(x) = (\frac{1}{(1-\frac{r_s}{r})}, -\sqrt{\frac{r_s}{r}}\cos\tilde\Theta(r), -\frac{1}{r}\sqrt{\frac{r_s}{r}}\frac{\sin\tilde\Theta(r)}{1-\frac{r_s}{r}}, 0) \quad (S59)$$

$$(e_{\hat{1}})^\mu(x) = (-\sqrt{\frac{r_s}{r}}\frac{\cos\Theta(r)}{(1-\frac{r_s}{r})}, \cos\Theta(r)\cos\tilde\Theta(r) - \sin\Theta(r)\sin\tilde\Theta(r)\sqrt{1-\frac{r_s}{r}},$$
$$\frac{1}{r}\frac{\sin\Theta(r)\cos\tilde\Theta(r)}{\sqrt{1-\frac{r_s}{r}}} + \frac{1}{r}\cos\Theta(r)\sin\tilde\Theta(r), 0)$$

$$(e_{\hat{2}})^\mu(x) = (\sqrt{\frac{r_s}{r}}\frac{\sin\tilde\Theta(r)}{(1-\frac{r_s}{r})}, \cos\Theta(r)\frac{\sin\tilde\Theta(r)}{(1-\frac{r_s}{r})} - \sin\Theta(r)\cos\tilde\Theta(r)\sqrt{1-\frac{r_s}{r}},$$
$$\frac{1}{r}\cos\Theta(r)\cos\tilde\Theta(r) - \frac{1}{r}\frac{\sin\Theta(r)\sin\tilde\Theta(r)}{\sqrt{1-\frac{r_s}{r}}}, 0)$$

$$(e_{\hat{3}})^\mu(x) = (e_\phi)^\mu(x) = (0, 0, 0, 1/r)$$

To get non-spinning frame, tetrads should be parallel transported. Thus, the following condition must hold $$u^\mu \nabla_\mu e_{\hat{a}}{}^t = 0. \quad (S60)$$

In other words, $$\frac{d}{dr}\tilde\Theta(r) = -\frac{l_{obs}}{2r^2 u^r}. \quad (S61)$$

Since $\sin\Theta(r)$ is approximately the same as $$-\sqrt{\frac{l^2}{rr_s}},$$

we can deduce the following relation:

$$\frac{d}{dr}\Theta(r) \square \frac{l_{obs}}{2r^2 u^r} = \frac{d}{dr}\tilde\Theta(r). \quad (S62)$$

In other words, these tetrads can be written approximately as $$(e_{\hat{0}})^\mu(x) = \quad (S63)$$

-continued $$(e_{\hat{t}})^\mu(x) = \left(\frac{1}{\left(1-\frac{r_s}{r}\right)}, -\sqrt{\frac{r_s}{r}}\cos\Theta(r), -\frac{1}{r}\sqrt{\frac{r_s}{r}}\frac{\sin\Theta(r)}{\sqrt{1-\frac{r_s}{r}}}, 0\right)$$

$$(e_{\hat{1}})^\mu(x) = (e_r)^\mu(x) = = \left(-\sqrt{\frac{r_s}{r}}\frac{\cos\Theta(r)}{\left(1-\frac{r_s}{r}\right)},\right.$$

$$\cos 2\Theta(r) + \sin^2\Theta(r)\left(1-\sqrt{\left(1-\frac{r_s}{r}\right)}\right), \frac{1}{r}\frac{\sin 2\Theta(r)}{2}\left(1+\frac{1}{\sqrt{1-\frac{r_s}{r}}}\right), 0\right)$$

$$(e_{\hat{2}})^\mu(x) = (e_\theta)^\mu(x) = = \left(\sqrt{\frac{r_s}{r}}\frac{\sin\Theta(r)}{\left(1-\frac{r_s}{r}\right)}, -\frac{\sin 2\Theta(r)}{2}\left(1+\sqrt{\left(1-\frac{r_s}{r}\right)}\right),\right.$$

$$\left.\frac{1}{r}\cos 2\Theta(r) + \frac{1}{r}\sin^2\Theta(r)\left(1-\frac{1}{\sqrt{1-\frac{r_s}{r}}}\right), 0\right)$$

$$(e_{\hat{3}})^\mu(x) = (e_\phi)^\mu(x) = (0, 0, 0, 1/r)$$

By ignoring the first order of $$\frac{r_s}{r},$$

the physical meaning becomes much clearer. The tetrads can be written as $$(e_{\hat{0}})^\mu(x) = (e_t)^\mu(x) = \left(1, -\sqrt{\frac{r_s}{r}}\cos\Theta(r), -\frac{1}{r}\sqrt{\frac{r_s}{r}}\sin\Theta(r), 0\right) \quad (S64)$$

$$(e_{\hat{1}})^\mu(x) = (e_r)^\mu(x) = = \left(-\sqrt{\frac{r_s}{r}}\cos\Theta(r), \cos 2\Theta(r), \frac{1}{r}\sin 2\Theta(r), 0\right)$$

$$(e_{\hat{2}})^\mu(x) = (e_\theta)^\mu(x) = = \left(\sqrt{\frac{r_s}{r}}\sin\Theta(r), -\sin 2\Theta(r), \frac{1}{r}\cos 2\Theta(r), 0\right).$$

$$(e_{\hat{3}})^\mu(x) = (e_\phi)^\mu(x) = (0, 0, 0, 1/r)$$

Thus, we can conclude that if the tetrads, which are non-spinning and free falling with non-zero angular momentum, are projected into 3-dimension space, they rotate by 2 times of $\Theta(r)$ when observer's moving direction rotates only by $\Theta(r)$. By the first order of angular momentum, l, and $$\frac{r_s}{r}$$

approximation, tetrads become $$(e_{\hat{0}})^\mu(x) = (e_t)^\mu(x) = \left(\frac{1}{(1-r_s/r)}, -\sqrt{\frac{r_s}{r}}, \frac{l}{r^2}, 0\right) \quad (S65)$$

$$(e_{\hat{1}})^\mu(x) = (e_r)^\mu(x) = \left(-\sqrt{\frac{r_s}{r}}\frac{1}{1-r_s/r}, 1, \frac{-2l}{\sqrt{r_s r^3}}, 0\right)$$

$$(e_{\hat{2}})^\mu(x) = (e_\theta)^\mu(x) = \left(\frac{-l}{r(1-r_s/r)}, \frac{l\left(2-\frac{r_s}{r}\right)}{\sqrt{r_s r}}, \frac{1}{r}, 0\right)$$

$$(e_{\hat{3}})^\mu(x) = (e_\phi)^\mu(x) = (0, 0, 0, 1/r)$$

The ILLT matrix is then given by $$(\lambda_{\hat{d}}^{\hat{c}}) = \begin{pmatrix} 0 & -\varepsilon_r^2\frac{k^t r_s}{2r^2} - \varepsilon_r\sqrt{\frac{r_s}{r}}\frac{k^r}{2r} & 0 & \varepsilon_r k^\phi\sqrt{\frac{r_s}{r}} \\ -\varepsilon_r^2\frac{k^t r_s}{2r^2} - \varepsilon_r\sqrt{\frac{r_s}{r}}\frac{k^r}{2r} & 0 & \varepsilon_l^2\frac{k^r l}{\sqrt{r^3 r_s}} & k^\phi \\ 0 & -\varepsilon_l^2\frac{k^r l}{\sqrt{r^3 r_s}} & 0 & \varepsilon_l^2\frac{2k^\phi l}{\sqrt{rr_s}} \\ \varepsilon_r k^\phi\sqrt{\frac{r_s}{r}} & -k^\phi & -\varepsilon_l^2\frac{2k^\phi l}{\sqrt{rr_s}} & 0 \end{pmatrix} \quad (S66)$$

Thus, the observer, falling free with non-zero angular momentum, sees the non-zero Wigner angle as $$\tilde{\psi} = -\varepsilon_l^2\frac{k^r l}{\sqrt{r^3 r_s}} \quad (S67)$$

Tetrads for Free Falling Observers with Non-Zero Angular Momentum II (Circular Orbit)

In this case, we also assume that e=1 for the simplicity of the calculations. The observer who is falling freely with angular momentum with e=1 has the 4-velocity vector such that $$u(\tau) = (e_{\hat{j}})^\mu(x) = \left(1/(1-r_s/r), u^r, 0, \frac{l}{r^2}\right) \quad (S68)$$

where $$u^r = -\left(\frac{r_s}{r} - \frac{l^2}{r^2}\left(1-\frac{r_s}{r}\right)\right)^{1/2}. \quad (S69)$$

In addition, by forcing the radial component of 4-velocity vector to be null, we can get $$(e_{\hat{0}})^\mu(x) = (e_t)^\mu(x) = \left(\frac{1}{\sqrt{1-\frac{3r_s}{2r}}}, 0, \frac{1}{r}\sqrt{\frac{r_s}{2r}}\frac{1}{\sqrt{1-\frac{3r_s}{2r}}}, 0\right) \quad (S70)$$

-continued $$(e_1)^\mu(x) = (e_r)^\mu(x)\left(-\sqrt{\frac{r_s}{2r}}\frac{\sin\tilde{\Theta}(r)}{\sqrt{1-\frac{3r_s}{2r}}\sqrt{1-\frac{r_s}{r}}},\right.$$

$$\left.\sqrt{1-\frac{r_s}{r}}\cos\tilde{\Theta}(r), -\frac{1}{r}\frac{\sqrt{1-\frac{r_s}{r}}\sin\tilde{\Theta}(r)}{\sqrt{1-\frac{3r_s}{2r}}}, 0\right)$$

$$(e_2)^\mu(x) = (e_\theta)^\mu(x)\left(\sqrt{\frac{r_s}{2r}}\frac{\cos\tilde{\Theta}(r)}{\sqrt{1-\frac{3r_s}{2r}}\sqrt{1-\frac{r_s}{r}}},\right.$$

$$\left.\sqrt{1-\frac{r_s}{r}}\sin\tilde{\Theta}(r), \sqrt{1-\frac{r_s}{r}}, \frac{1}{r}\frac{\sqrt{1-\frac{r_s}{r}}\cos\tilde{\Theta}(r)}{\sqrt{1-\frac{3r_s}{2r}}}, 0\right)$$

$$(e_3)^\mu(x) = (e_\phi)^\mu(x) = (0, 0, 0, \csc\theta/r)$$

Likewise, by adding non-spinning condition, we can get $$\tilde{\Theta}(r) = \sqrt{1-\frac{3r_s}{2r}}(\theta-\theta_0). \quad (S71)$$

By ignoring the first order of rs/r, tetrads are written as $$(e_0)^\mu(x) = (e_t)^\mu(x) = \left(1, 0\frac{1}{r}\sqrt{\frac{r_s}{2r}}, 0\right) \quad (S72)$$

$$(e_1)^\mu(x) = (e_r)^\mu(x)\left(-\sqrt{\frac{r_s}{2r}}\sin\tilde{\Theta}(r), \cos\tilde{\Theta}(r), -\frac{1}{r}\sin\tilde{\Theta}(r), 0\right)$$

$$(e_2)^\mu(x) = (e_\theta)^\mu(x)\left(\sqrt{\frac{r_s}{2r}}\cos\tilde{\Theta}(r), \sin\tilde{\Theta}(r), \frac{1}{r}\cos\tilde{\Theta}(r, 0)\right)$$

$$(e_3)^\mu(x) = (e_\phi)^\mu(x) = (0, 0, 0, \csc\theta/r)$$

where $\tilde{\Theta}(r)=(\theta-\theta_0)$.

That is, by projecting tetrads into 3-dimensional space, one can see that tetrads rotate by $-\theta$ when observer moves by $r\theta$. This is quite a non-relativistic effect, since the rotation, induced by parallel transportation condition, is just compensation of the effect of spherical coordinate system. In FIG. S1, the components, classical and quantum, of the Wigner rotation for an free-falling observer with non-zero angular momentum for the circular orbit. We set angular momentum of observers as $$0.4\sqrt{r_s r_{earth}}.$$

From Wigner Angle to the Rotation Angle of Polarization $$\varepsilon_\pm^{\prime\mu}(\hat{k}') \equiv D(\Lambda)\varepsilon_\pm^\mu(\hat{k}') = R(\Lambda\hat{k})R_z(\psi(\Lambda,\vec{n}))R(\hat{k})^{-1}\varepsilon_\pm^\mu(\hat{k}) \quad (S73)$$

$$\varepsilon_\phi^\mu(\hat{k}) = \frac{1}{\sqrt{2}}(e^{i\phi}\varepsilon_+^\mu(\hat{k}) + e^{-i\phi}\varepsilon_-^\mu(\hat{k})) = R(\hat{k})\begin{bmatrix}0\\\cos\phi\\\sin\phi\\0\end{bmatrix} \equiv R(\hat{k})\varepsilon_\phi^\mu(\hat{z}) \quad (S74)$$

$$\varepsilon_\phi^{\prime\mu}(\hat{k}') = \quad (S75)$$

$$\frac{1}{\sqrt{2}}(e^{i\phi'}\varepsilon_+^\mu(\hat{k}') + e^{-i\phi'}\varepsilon_-^\mu(\hat{k}')) = R(\Lambda\hat{k})\begin{bmatrix}0\\\cos\phi'\\\sin\phi'\\0\end{bmatrix} \equiv R(\Lambda\hat{k})\tilde{\varepsilon}_{\phi'}^{\prime\mu}(\hat{z})$$

$$\tilde{\varepsilon}_{\phi'}^{\prime\mu}(\hat{z}) = R_z(\psi(\Lambda,\vec{n}))\tilde{\varepsilon}_\phi^\mu(\hat{z}) \quad (S76)$$

$$\therefore \phi' = \phi + \psi \quad (S77)$$

This result tells us Wigner angle is the same with polarization rotation angle only in the standard frame. However, our 3-axis is not parallel to the wave vector. Therefore, by decomposing Wigner rotation into other rotations, we can get the rotation angle about wave vector, induced by Wigner rotation, which corresponds to the angle of polarization rotation. If a rotation is denoted by (n,φ), the rotation can be decomposed into three consecutive rotations denoted by ($n_i$, $\varphi_i$) with the axis unit vectors, $n_i$, and the corresponding rotation angles, $\varphi_i$. When mutually orthogonal axes are considered, the following relation holds[Decomposition of a Finite Rotation . . . ], $$\sin\varphi_3 = \frac{b_1 b_2(1-\cos\varphi) + b_3\sin\varphi}{\cos\varphi_2} \quad (S78)$$

where $b_i = n \cdot n_i$. Since we deal with infinitesimal angles, we can get $$\varphi_3 = b_3\varphi \quad (S79)$$

In our case, the unit vectors, n,$n_i$, are defined by $$n_i = \frac{\partial}{\partial x^i}, n = \frac{k^{\hat{i}}}{k^{\hat{t}}}\frac{\partial}{\partial x^{\hat{i}}}, \quad (S80)$$

The coefficient, $b_i$, is obtained from the definition $$b_i = n \cdot n_i = \frac{k^{\hat{i}}}{k^{\hat{t}}} = \frac{\eta^{\hat{i}\hat{i}}e_{\hat{i}}^\mu(g_{\mu\mu}k^\mu)}{\eta^{\hat{0}\hat{0}}e_{\hat{t}}^\mu(g_{\mu\mu}k^\mu)} \cong \frac{rk^\phi}{k^t} \quad (i=1,2,3) \quad (S81)$$

Therefore, Eq. (S78) becomes $$\text{polarization angle} = \frac{rk^\phi}{k^t} \times (\text{Wigner rotation angle}) \quad (S82)$$

The corresponding infinitesimal polarization rotation angle is $$\tilde{\psi} = -\varepsilon_i^2 \frac{k^\phi k^j l}{k^l \sqrt{rr_s}}. \quad (S83)$$

Torsion-Free

Every tetrads used in this paper is torsion-free. It is easy to check whether the local frame described by tetrads has torsion or not by calculating components of torsion tensor in the local basis, which are defined as:

$$T^{\hat{a}}{}_{\hat{b}\hat{c}} = \Gamma_{\hat{b}\hat{c}}{}^{\hat{a}} - \Gamma_{\hat{c}\hat{b}}{}^{\hat{a}} - c_{\hat{b}\hat{c}}{}^{\hat{a}}, \text{ where } \Gamma_{\hat{b}\hat{c}}{}^{\hat{a}} = e^{\hat{a}}{}_\mu e_{\hat{b}}{}^\nu \nabla_\nu e_{\hat{c}}{}^\mu \text{ and } c_{\hat{a}\hat{b}}{}^{\hat{c}} = \Gamma^{\hat{c}}{}_{\hat{a}\hat{b}} - \Gamma^{\hat{c}}{}_{\hat{b}\hat{a}}. \quad (S84)$$

Method for Measuring a Distance to a Satellite

Figure 6:
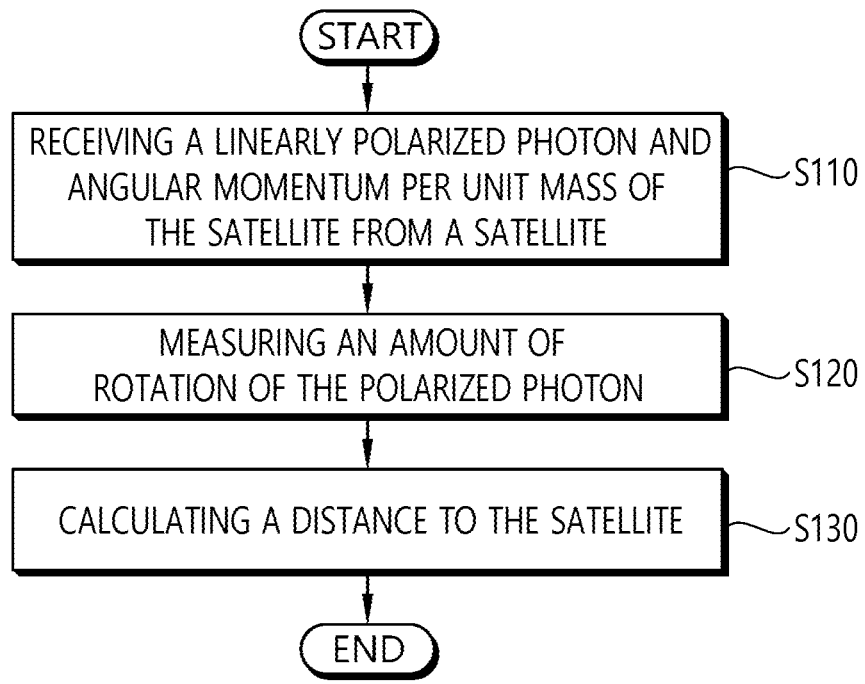
FIG. 6 is a flow chart showing a method for measuring a distance to a satellite according to an exemplary embodiment of the present invention.

FIG. 6 is a flow chart showing a method for measuring a distance to a satellite according to an exemplary embodiment of the present invention.

Referring to FIG. 6, according to a method of measuring a distance to a satellite, according to an exemplary embodiment of the present invention, an electronic device receive a linearly polarized photon from and angular momentum per unit mass of the satellite the satellite (step S110). For example, the electronic device may be a user terminal such as a navigation system for a vehicle, a smartphone, etc.

Then, the electronic device measures an amount of rotation of the polarized photon, the rotation being induced by a space-time warpage due to gravity (step S120).

Then, the electronic device calculates a distance to the satellite by using the rotation amount of the polarized photon and the angular momentum per unit mass of the satellite (step S130).

For example, the distance to the satellite may be calculated by the following equation, $$\sin\Theta(r) \cong -\frac{l_{obs}}{\sqrt{rr_s}}\sqrt{1-\frac{r_s}{r}},$$

wherein '2Θ' is the rotation amount of polarized photon, '$l_{obs}$' is the angular momentum per unit mass of the satellite, 'r' is the distance to the satellite, and '$r_s$' is the Schwarzschild radius of the Earth.

The above equation is explained above in detail, so that any further explanation will be omitted.

Method for Measuring a Position

Figure 7:
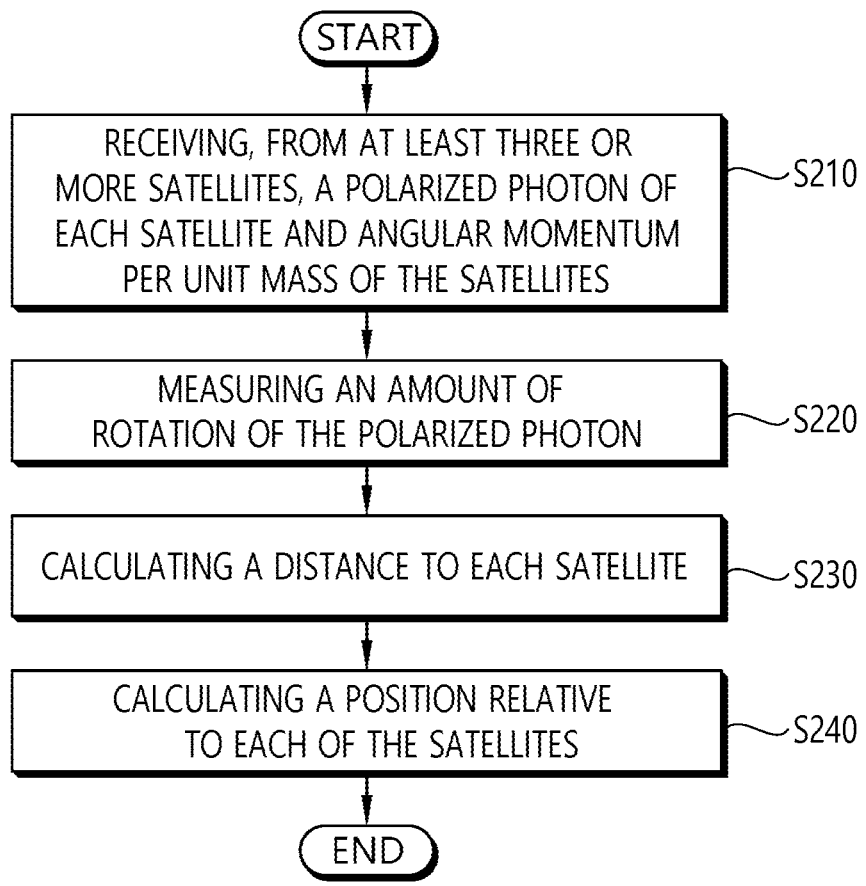
FIG. 7 is a flow chart showing a method for measuring a position according to an exemplary embodiment of the present invention.

FIG. 7 is a flow chart showing a method for measuring a position according to an exemplary embodiment of the present invention.

Referring to FIG. 7, according to a method of measuring a location according to an exemplary embodiment of the present invention, an electronic device receives, from at least three or more satellites, a polarized photon of each satellite and angular momentum per unit mass of the satellites (step S210). Preferably, it is desirable to receive linearly polarized photons of each satellite and angular momentum per unit mass of the satellite from four or more satellites in consideration of the height of the electronic device. That is, when it is assumed that the electronic device exists on a perfect spherical surface, three satellites are sufficient, but since the Earth's surface has elevations, at least four or more satellites are required to accurately measure a location.

Then, the electronic device measures an amount of rotation of the polarized photon of each satellite, the rotation being induced by warpage of space-time due to gravity (step S220), and calculates a distance to each satellite by using a rotation amount of polarization of each satellite and an angular momentum per unit mass of each satellite (step S230).

The distance to each satellite may be calculated by the following equation, $$\sin\Theta(r) \cong -\frac{l_{obs}}{\sqrt{rr_s}}\sqrt{1-\frac{r_s}{r}},$$

wherein '2Θ' is the rotation amount of polarized photon, '$l_{obs}$' is the angular momentum per unit mass of the satellite, 'r' is the distance to the satellite, and '$r_s$' is the Schwarzschild radius of the Earth.

Then, the electronic device calculates a position relative to each of the satellites by using the distance to each of the satellites (step S240). This process will be explained in detail, referring to FIG. 9.

Figure 8:
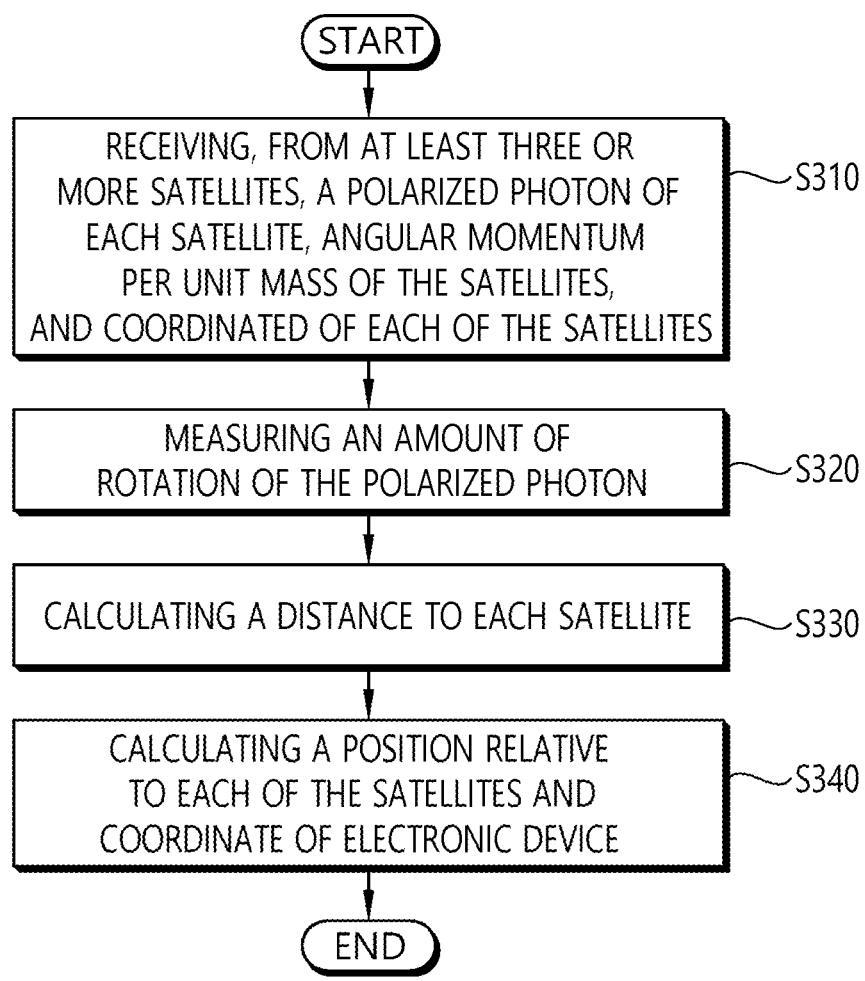
FIG. 8 is a flow chart showing a method for measuring a location according to another exemplary embodiment of the present invention.

FIG. 8 is a flow chart showing a method for measuring a location according to another exemplary embodiment of the present invention. In the previous embodiment of FIG. 7, only the position of the electronic device, which is relative to each satellite can be obtained, but the absolute position (or coordination) of the electronic device can be obtained in the present embodiment by using the absolute coordination.

Referring to FIG. 7 and FIG. 8, the electronic device further receives a coordinated of each of the satellites from each of the satellites by the electronic device (step S310), when receiving the polarized photon and angular momentum per unit mass of the satellites (step S210).

Further, the electronic device calculates a position of the electronic device (step S340), when calculating a position relative to each of the satellites (step S240).

Hereinafter, a principle of measuring the relative position and the absolute position of the electronic device will be described with reference to FIG. 9 below.

Figure 9:
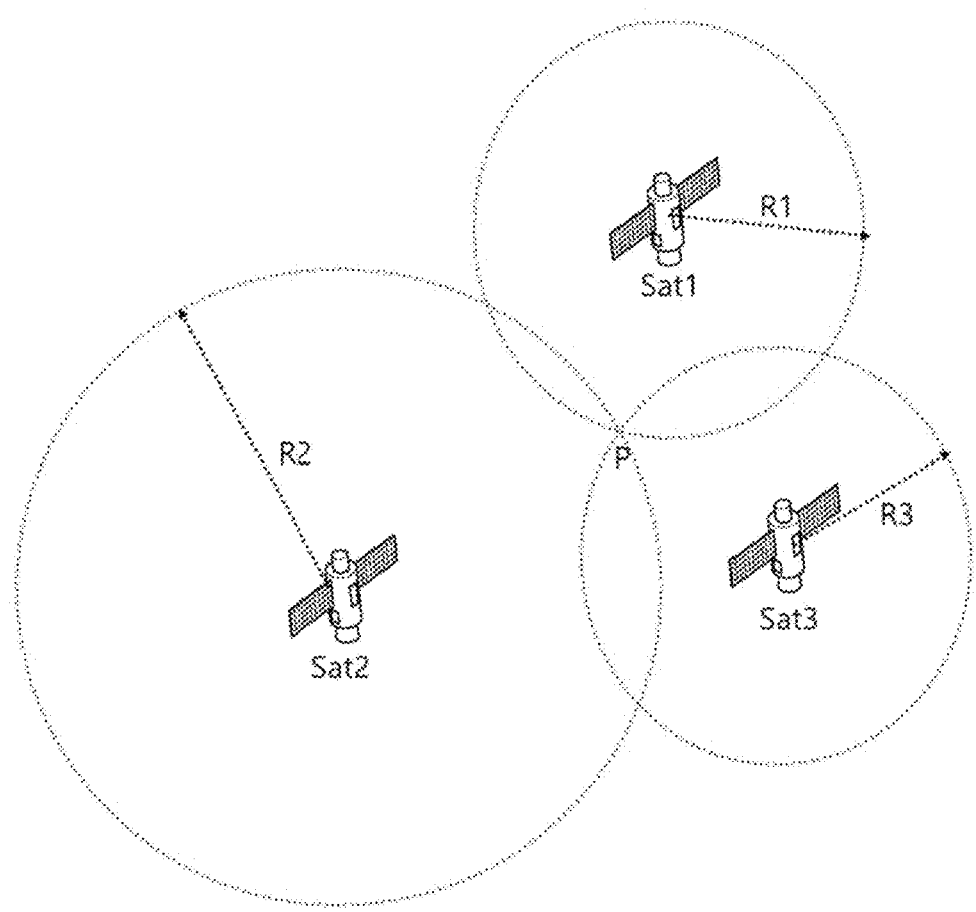
FIG. 9 is a diagram showing a method of measuring relative positions between satellites using distances from three satellites.

FIG. 9 is a diagram showing a method of measuring relative positions between satellites using distances from three satellites.

Referring to FIG. 9, when a user terminal is separated by R1 from the first satellite (Sat1), by R2 from the second satellite (Sat2), and separated by R3 from the third satellite (Sat3), the location of the user terminal is fixed to the point P.

In FIG. 9, it will be understood that the location of the user terminal is fixed in the case of three satellites in a two-dimensional space with no height, but four satellites are required if there is a three-dimensional space with a height.

User Terminal

Figure 10:
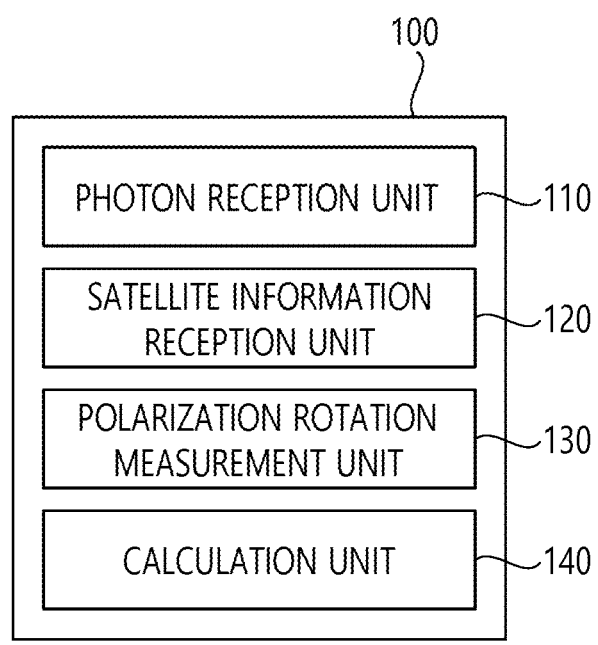
FIG. 10 is a block diagram showing a user terminal for implementing a method for measuring a location according to the present invention.

FIG. 10 is a block diagram showing a user terminal for implementing a method for measuring a location according to the present invention.

Referring to FIG. 10, a user terminal 100 according to an exemplary embodiment of the present invention comprises a photon reception unit 110, a satellite information reception unit 120, a polarization rotation measurement unit 130, and a calculation unit 140.

The photon reception unit 110 receives a polarized photon of each satellite from at least three or more satellites.

The satellite information reception unit 120 receives an angular momentum per unit mass of each satellite from the at least three or more satellites.

The polarization rotation measurement unit 130 measures a rotation amount of the polarized photon received by the photon receiving unit 110 from each satellite.

The calculation unit 140 calculates a distance to each of the satellites by using the rotation amount of the polarized photon, and the angular momentum per unit mass of each of the satellites, and calculates relative position of the user terminal by using the distance to each of the satellites as shown in FIG. 7. For example, the calculation units 140 may calculate the distance to each of the satellites by the following equation, $$\sin\Theta(r) \cong -\frac{l_{obs}}{\sqrt{rr_s}}\sqrt{1-\frac{r_s}{r}},$$

wherein '2Θ' is the rotation amount of polarized photon, '$l_{obs}$' is the angular momentum per unit mass of the satellite, 'r' is the distance to the satellite, and '$r_s$' is the Schwarzschild radius of the Earth.

Preferably, the satellite information reception unit 120 may further receive a coordinate of each of the satellites from the each of the satellites, and the calculation unit 140 may calculate a coordinates of the user terminal by using the coordinate of each of the satellites.

As described above, according to the present invention, it is possible to more accurately measure the distance between the satellite and the user terminal, thereby improving accuracy in a location measuring system such as GPS.

It will be apparent to those skilled in the art that various modifications and variation may be made in the present invention without departing from the spirit or scope of the invention. Thus, it is intended that the present invention cover the modifications and variations of this invention provided they come within the scope of the appended claims and their equivalents.

What is claimed is:

1. A method of measuring a distance to a satellite, which is performed by an electronic device, the method comprising:
    receiving a linearly polarized photon and angular momentum per unit mass of the satellite from the satellite;
    measuring an amount of rotation of the polarized photon, the rotation being induced by a space-time warpage due to gravity; and
    calculating a distance to the satellite by using the rotation amount of the polarized photon and the angular momentum per unit mass of the satellite.

2. The method of claim 1, wherein the distance to the satellite is calculated by the following equation, $$\sin\theta(r) \cong -\frac{l_{obs}}{\sqrt{rr_s}}\sqrt{1-\frac{r_s}{r}}$$

wherein
    '2Θ' is the rotation amount of polarized photon,
    '$l_{obs}$' is the angular momentum per unit mass of the satellite,
    'r' is the distance to the satellite, and
    '$r_s$' the Schwarzschild radius of the Earth.

3. A method of measuring a location comprising:
    receiving, by an electronic device, from at least three or more satellites, a polarized photon of each satellite and angular momentum per unit mass of the satellites;
    measuring, by the electronic device, an amount of rotation of the polarized photon of each satellite, the rotation being induced by warpage of space-time due to gravity;
    calculating, by the electronic device, a distance to each satellite by using a rotation amount of polarization of each satellite and an angular momentum per unit mass of each satellite; and
    calculating a position relative to each of the satellites by the electronic device by using the distance to each of the satellites.

4. The method of claim 3, wherein the distance to each satellite is calculated by the following equation, $$\sin\theta(r) \cong -\frac{l_{obs}}{\sqrt{rr_s}}\sqrt{1-\frac{r_s}{r}}$$

wherein
    '2Θ' is the rotation amount of polarized photon,
    '$l_{obs}$' is the angular momentum per unit mass of the satellite,
    'r' is the distance to the satellite, and
    '$r_s$' the Schwarzschild radius of the Earth.

5. The method of claim 3, wherein
the electronic device further receives a coordinated of each of the satellites from each of the satellites when receiving the polarized photon and angular momentum per unit mass of the satellites, and
the electronic device further calculates a position of the electronic device when calculating a position relative to each of the satellites.

6. A user terminal comprising:
    a photon reception unit receiving a polarized photon of each satellite from at least three or more satellites;
    a satellite information reception unit receiving an angular momentum per unit mass of each satellite from the at least three or more satellites;
    a polarization rotation measurement unit measuring a rotation amount of the polarized photon received by the photon receiving unit from each satellite; and
    a calculation unit calculating a distance to each of the satellites by using the rotation amount of the polarized photon and the angular momentum per unit mass of each of the satellites, and calculating relative position of the user terminal by using the distance to each of the satellites.

7. The user terminal of claim 6, wherein the calculation units calculates the distance to each of the satellites by the following equation, $$\sin\theta(r) \cong -\frac{l_{obs}}{\sqrt{rr_s}}\sqrt{1-\frac{r_s}{r}}$$

wherein
    '2Θ' is the rotation amount of polarized photon,
    '$l_{obs}$' is the angular momentum per unit mass of the satellite,
    'r' is the distance to the satellite, and
    '$r_s$' the Schwarzschild radius of the Earth.

8. The user terminal of claim 6, wherein
the satellite information reception unit further receives a coordinate of each of the satellites from the each of the satellites, and
the calculation unit calculates a coordinates of the user terminal by using the coordinate of each of the satellites.

* * * * *